United States Patent [19]

Asai et al.

[11] Patent Number: 4,706,617
[45] Date of Patent: Nov. 17, 1987

[54] TWO-CYCLE ENGINE

[75] Inventors: Masahiro Asai, Tokorozawa; Toshio Mizushima, Wako; Toshiro Kawai, Asaka; Shigemitsu Akutsu, Nerima; Yoshiaki Uozumi, Wako, all of Japan

[73] Assignee: Honda Giken Kogyo Kabushiki Kaisha, Japan

[21] Appl. No.: 770,056

[22] Filed: Aug. 27, 1985

[30] Foreign Application Priority Data

| Aug. 28, 1984 | [JP] | Japan | 59-178873 |
| Dec. 29, 1984 | [JP] | Japan | 59-276554 |
| Dec. 29, 1984 | [JP] | Japan | 59-276555 |
| Jan. 11, 1985 | [JP] | Japan | 60-2787 |
| Jan. 11, 1985 | [JP] | Japan | 60-2788 |
| Jan. 12, 1985 | [JP] | Japan | 60-3720 |
| Jan. 12, 1985 | [JP] | Japan | 60-3721 |
| Jan. 12, 1985 | [JP] | Japan | 60-3722 |
| Jan. 30, 1985 | [JP] | Japan | 60-16271 |
| Jan. 30, 1985 | [JP] | Japan | 60-16272 |
| Apr. 19, 1985 | [JP] | Japan | 60-83820 |

[51] Int. Cl.$^4$ .......................................... F02B 75/02
[52] U.S. Cl. ............................. 123/65 PE; 123/65 V
[58] Field of Search ............. 123/65 PE, 65 V, 65 P, 123/65 PD, 65 EM

[56] References Cited

U.S. PATENT DOCUMENTS

| 4,121,552 | 10/1978 | Mithou et al. | 123/65 PE |
| 4,157,699 | 6/1979 | Mori | 123/417 |
| 4,285,311 | 8/1981 | Iio | 123/73 R |
| 4,321,893 | 3/1982 | Yamamoto | 123/65 PE |
| 4,341,188 | 7/1982 | Nerstrom | 123/65 PE |
| 4,364,346 | 12/1982 | Shiohara | 123/65 PE |
| 4,455,973 | 6/1984 | Stadler et al. | 123/41.76 |

FOREIGN PATENT DOCUMENTS

| 0141650 | 5/1985 | European Pat. Off. | 123/65 PE |
| 0126812 | 10/1979 | Japan | 123/65 V |
| 54-158514 | 12/1979 | Japan | 123/65 PE |

Primary Examiner—Craig R. Feinberg
Assistant Examiner—David A. Okonsky
Attorney, Agent, or Firm—Darby & Darby

[57] ABSTRACT

A two-cycle engine includes a port timing control device including a port timing control valve which is mounted on a cylinder block and has a timing control surface. The control valve is movable in a plane substantially perpendicular to the axis of a cylinder between a closed position where the valve is disposed in an exhaust passage with the control surface closing the end portion of the exhaust port closer to a cylinder head and an open position where the valve is held out of the exhaust passage to open the end portion of the exhaust port. The control surface is of an arcuate concave shape and having a curvature substantially equal to that of an inner peripheral surface of the cylinder so as to be smoothly continuous with the inner peripheral surface of the cylinder.

20 Claims, 34 Drawing Figures

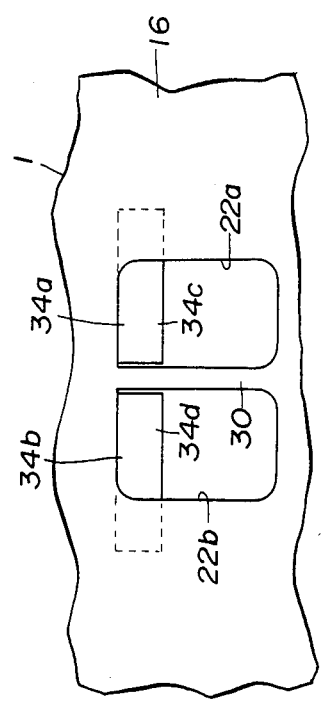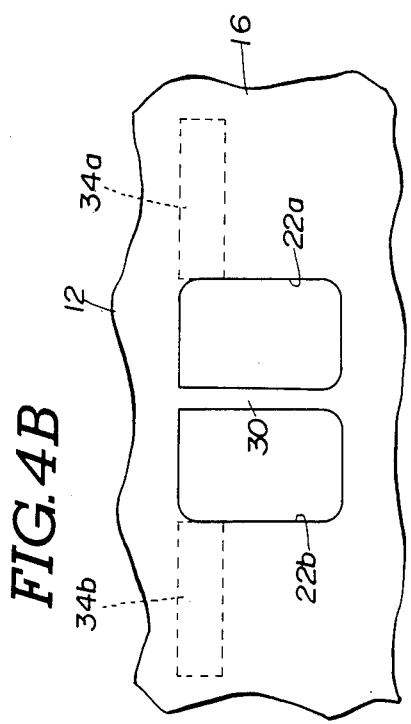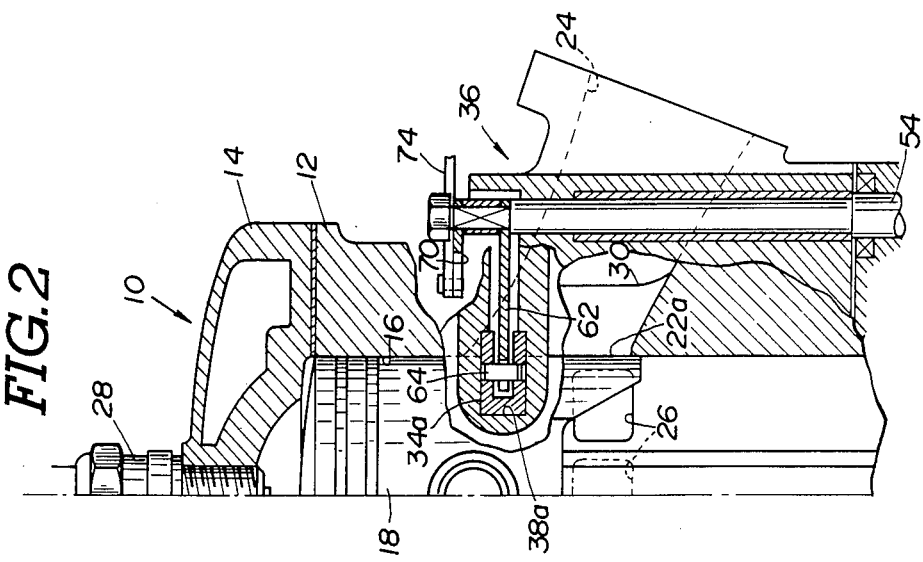

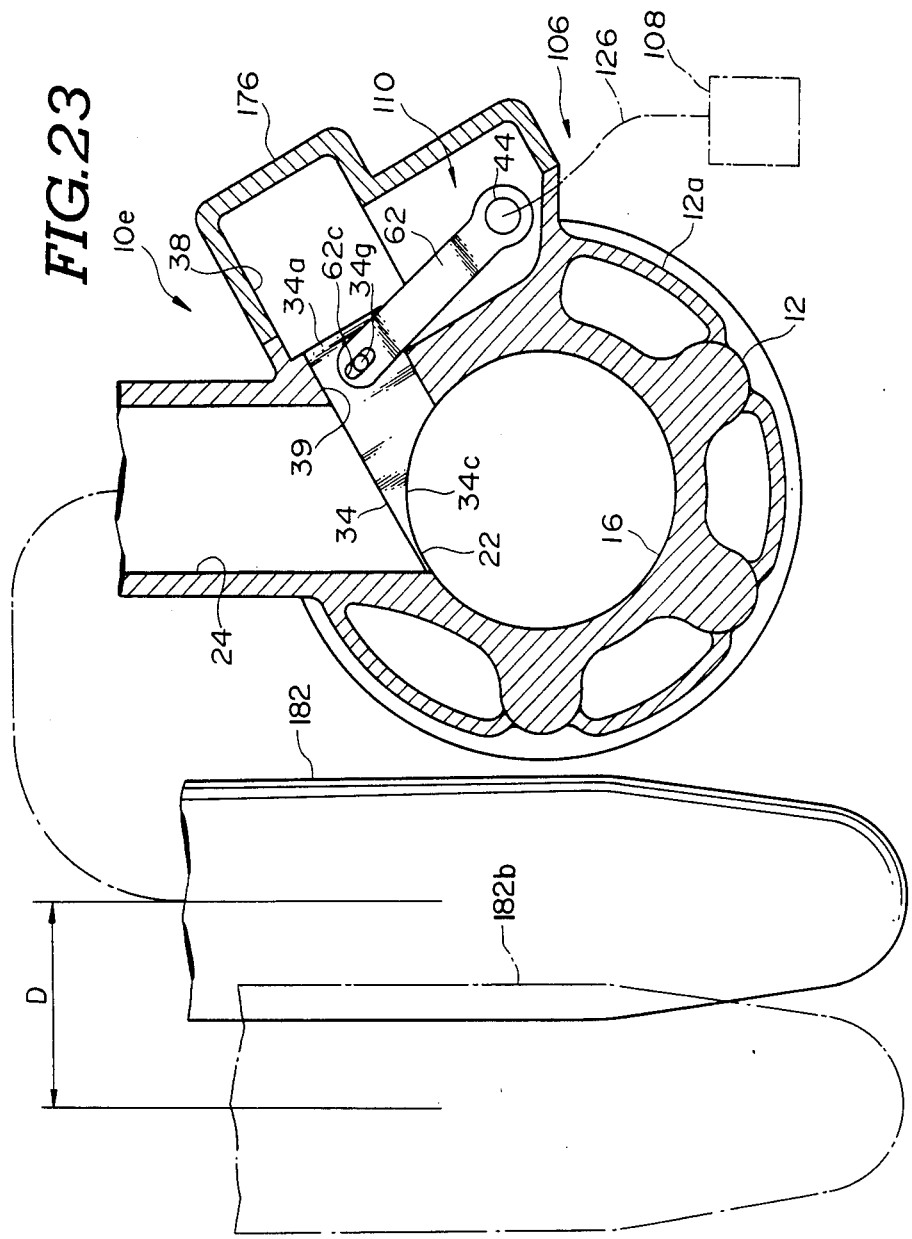

TWO-CYCLE ENGINE

BACKGROUND OF THE INVENTION

1. Field of the Invention

This invention relates generally to two-cycle engines and more particularly to two-cycle engines with means for varying a port timing in accordance with the engine speed to improve power output.

2. Prior Art

As is well known, in a two-cycle internal combustion engine, an exhaust port is selectively closed by a reciprocating piston in a cylinder during the operation of the engine.

One conventional port timing control device as disclosed in Japanese patent publication No. 47-36047 comprises a port timing control valve comprising an elongated valve element of an arcuate plate and a lever carrying at one end the valve element and pivotally mounted on an upper portion of a wall of the exhaust passage, so that the valve element is movable between an open position where the valve element is received in a recess formed in a lower portion of the wall of the exhaust passage and a closed position where the valve element closes an upper portion of the exhaust port to delay an exhaust timing. This conventional port timing control device has been found not entirely satisfactory, however, in that when the valve is in its open position with the valve element received in the recess, the pivotal lever extends through the exhaust passage diametrically thereof adjacent to the exhaust port and therefore affects the flow of the exhaust gas from the exhaust port.

Another conventional port timing control device, as disclosed in Japanese patent application Laid-Open (Kokai) No. 58-42868 and Japanese Utility Model Publication No. 58-5063, comprises a port timing control valve of a generally semicylindrical shape mounted on a wall of an exhaust passage for angular movement about an axis perpendicular to the axis of the cylinder between an open position where the valve is held in a recess formed in an upper portion of the exhaust passage wall and a closed position where the valve is held in the exhaust passage with a peripheral surface thereof, serving as a timing control surface, closing an upper portion of the exhaust port to delay an exhaust timing. The timing control surface of the valve is held in sliding contact with a complementarily-contoured surface of the recess. Unburned products, such as carbon, contained in an exhaust gas discharged from the combustion chamber via the exhaust port tends to deposit on the timing control surface of the valve when the valve is in its closed position. Therefore, it is quite possible that the deposited products prevent the valve from moving smoothly between its open and closed positions. In addition, the generally semi-cylindrical valve is reduced in cross-sectional area progressively from its opposite ends toward a center thereof, so that it is rather difficult for the peripheral timing control surface to be closely fitted on the peripheral surface of the piston when the valve is in its closed position.

SUMMARY OF THE INVENTION

It is therefore an object of this invention to provide a two-cycle engine incorporating a port timing control means in which a port timing control valve can be operated in a reliable manner for a prolonged period of time and will not affect the flow of exhaust gas discharged from the exhaust port.

According to the present invention, there is provided a two-cycle engine comprising:

(a) a cylinder block having a cylinder head thereon, said cylinder block having a cylinder and an exhaust port formed in a side wall of said cylinder, and said cylinder block having an exhaust passage communicating with said exhaust port;

(b) a piston received in said cylinder for reciprocal movement therealong; and (c) a port timing control means comprising a port timing control valve which is mounted on said cylinder block and has a timing control surface, said control valve being movable in a plane substantially perpendicular to the axis of said cylinder between a closed position where said valve is disposed in said exhaust passage with said timing control surface closing the end portion of said exhaust port closer to said cylinder head and an open position where said valve is held out of said exhaust passage to open said end portion of said exhaust port, said timing control surface being of an arcuate concave shape and having a curvature substantially equal to that of an inner peripheral surface of said cylinder so as to be smoothly continuous with the inner peripheral surface of said cylinder.

BRIEF DESCRIPTION OF THE DRAWINGS

FIG. 2 is fragmentary vertical cross-sectional view of the engine;

FIGS. 4A and 4B are fragmentary views as viewed in the direction of arrow IV of FIG. 1, showing the operation of a port timing control valve;

FIG. 23 is a cross-sectional view of a further modified engine;

DESCRIPTION OF THE PREFERRED EMBODIMENTS OF THE INVENTION

Figure 1:
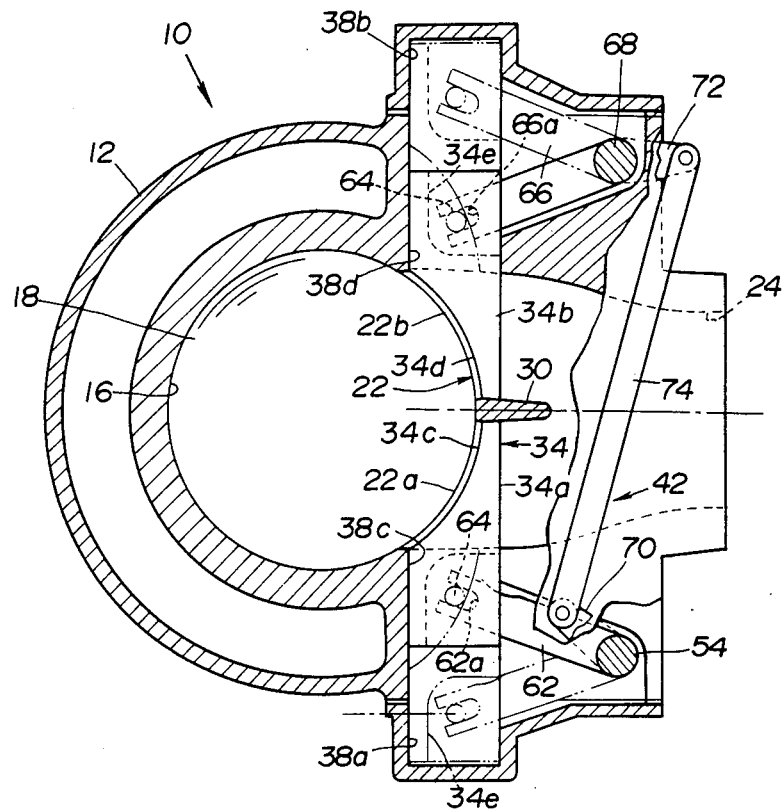
FIG. 1 is a horizontal cross-sectional view of a two-cycle engine provided in accordance with the present invention.

The invention will now be described with reference to the accompanying drawings in which like reference numerals denote corresponding parts in several views.

Figure 3:
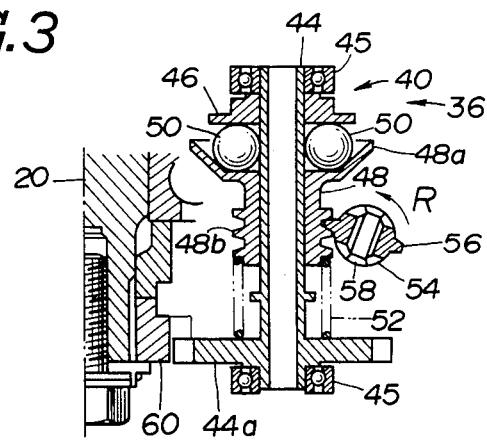
FIG. 3 is a fragmentary cross-sectional view showing a centrifugal governor.

FIGS. 1 and 2 show a two-cycle internal combustion engine 10 which comprises a cylinder block 12 having a cylinder head 14 thereon, the block having a cylinder 16. A piston 18 is received in the cylinder 16 for reciprocal movement therealong. The piston 18 is connected to a crankshaft 20 (FIG. 3) via a connecting rod (not shown). An exhaust port 22 is formed in a side wall of the cylinder 16, and an exhaust passage 24 is formed in the cylinder block 12 and opens to the exhaust port 22 at one end thereof. An intake port (not shown) for introducing an air/fuel mixture from a carburetor (not shown) into the engine 10 is formed in a wall of a crankcase (not shown) secured to the cylinder block 12. Scavenge ports 26 are also formed in the wall of the cylinder 16 and communicate with a crankcase chamber. The exhaust port 22 and the scavenge ports 26 are opened and closed by the piston 18 moving along the cylinder 16. A spark plug 28 is threaded through the cylinder head 14 for igniting the air/fuel mixture in a combustion chamber defined by the cylinder 16 and the cylinder head 14.

A partition wall 30 extends between upper and lower portions of the wall of the exhaust passage 24 along the axis of the cylinder 16 centrally of the width of the exhaust port 22 and is disposed immediately adjacent to the exhaust port 22, so that the exhaust port 22 is divided by the partition wall 30 into a pair of first and second portions 22a and 22b which are juxtaposed circumferentially of the cylinder 16 and are disposed symmetrically with respect to the partition wall 30. The partition wall 30 serves to cause the exhaust gas from the combustion chamber to flow smoothly and also to reinforce the exhaust port 22.

A port timing control means is provided for varying an exhaust port timing in accordance with the engine speed. The port timing control means comprises a port timing control valve 34 and a drive means 36 for driving the control valve 34 into and out of a closed position, as will hereinafter more fully be described.

The control valve 34 comprises a pair of first and second elongated valve elements 34a and 34b of a rectangular cross-section disposed coaxially with each other, the valve elements 34a and 34b being slidably received respectively in a pair of guide recesses 38a and 38b formed in the cylinder block 12 for movement toward and away from each other along respective their respective axes lying in a plane perpendicular to the axis of the cylinder 16. In other words, the first and second valve elements 34a and 34b are movable toward and away from each other along respective straight paths lying on a common plane. The guide recesses 38a and 38b are disposed in opposed relation to each other and opening to the exhaust passage 24. Each of the valve elements 34a and 34b has a timing control surface 34c, 34d of an arcuate concave shape formed in one side face facing the exhaust port 22 at an inner portion thereof. A curvature of each control surface 34c and 34d is substantially equal to or slighter greater than that of the inner peripheral surface of the cylinder 16.

Each of the first and second valve elements 34a and 34b is movable between a closed position, indicated in solid lines in FIG. 1, where the first and second valve elements 34a and 34b are disposed in the exhaust passage 24 with their respective control surface 34c and 34d closing the upper end portions of the first and second portions 22a and 22b of the exhaust port 22, respectively (FIG. 4A), and an open position, indicated in dot and dash lines in FIG. 1, where the valve elements 34a and 34b are held out of the exhaust passage 24 and fully received in the guide recesses 38a and 38b, respectively, to open the upper end portions (FIG. 4A). In the closed positions of the first and second valve elements 34a and 34b the first and second control surfaces 34c and 34d are smoothly continuous with the inner peripheral surface of the cylinder 16 and the surface of the partition wall 30 facing the cylinder. Also, in these closed positions, the distal tip ends of the first and second valve elements 34a and 34b are held in contact with the opposite side surfaces of the partition wall 30.

The drive means 36 comprises a centrifugal governor 40 and a linkage or power transmission means 42. The centrifugal governor 40 comprises a shaft 44 mounted on the crankcase through bearings 45 and 45 for rotation about an axis thereof and having an integral gear 44a at one end, a disc 46 fixedly mounted on the shaft 44, a sleeve 48 mounted on the shaft 44 for movement therealong and having a dish-shaped portion 48a at one end and a rack portion 48b around the other end, balls 50 received by the dish-shaped portion 48a, and a compression coil spring 52 wound around the shaft 44 and acting between the gear 44a and the end face of the sleeve 48 for normally urging the balls 50 against the disc 46. An output shaft 54 is supported by the cylinder block 12 for rotation about an axis thereof and has a pinion 56 secured thereto by a pin 58 and meshingly engaging the rack portion 48b, the output shaft 54 extending parallel to the axis of the cylinder 16. A gear 60 is mounted on the crankshaft 20 and meshingly engages the gear 44a. The coil spring 52 is so preloaded that when the crankshaft 20 is rotated at above a preselected speed, the balls 50 are moved outwardly under the influence of a centrifugal force, thereby causing the sleeve 48 to move along the shaft 44 toward the gear 44a to rotate the output shaft 54 in a direction R indicated in FIG. 3. Thus, when the engine speed reaches a predetermined level, the centrifugal governor 40 is operated.

Referring to the linkage 42, a first lever 62 is fixedly secured at one end to the output shaft 54, and the other end of the lever 62 is received in a recess 34e formed in the outer end of the first valve element 34a. The other end of the first lever 62 has a slot 62a, and a pin 64 is secured to the outer end of the first valve element 34a and extends through the slot 62a. A second lever 66 is fixedly secured at one end to a shaft 68 rotatably mounted on the cylinder block 12 and extending parallel to the axis of the cylinder 16, and the other end of the lever 66 is received in a recess 34e formed in the outer end of the second valve element 34b. A pin 64 is secured to the outer end of the second valve element 34b and extends through a slot 66a formed in the other end of the second lever 66. A pair of first and second links 70 and 72 are fixedly connected at their one ends to the output shaft 54 and the shaft 68, respectively, and are pivoted at the other ends to opposite ends of a interconnecting link 74. With this construction, when the output shaft 54 is angularly moved in the direction R (FIG. 3), the first and second valve elements 34a and 34b are moved away from each other, that is, from their respective closed to open positions, through the linkage 42.

The operation of the engine 10 will now be described. In a lower range of the engine speed, the centrifugal governor 42 is not operated since the coil spring 52 holds the balls 50 against outward movement. In this condition, the first and second valve elements 34a and 34b are held in their respective closed positions (FIG. 4A) with their respective control surface 34c, 34d closing the upper end portions of the first and second portions 22a and 22b of the exhaust port 22, respectively. Therefore, it can be said that the effective upper edge of the exhaust port 22 is lowered a distance equal to the thickness of the first and second valve elements 34a and 34b, thereby delaying the exhaust timing.

When the engine speed reaches a predetermined higher level, the centrifugal governor 40 is operated to angularly move the output shaft 54 in the direction R, so that the first and second valve elements 34a and 34b are moved from their respective closed to open positions. Therefore, the exhaust stroke starts earlier at this higher engine speed than at the above lower engine speed. And, when the engine speed goes below the above predetermined level, the first and second valve members 34a and 34b are moved from their respective open to closed positions through the drive means 36. Thus, the engine 10 can produce a good power output over a wide range of the engine speed, i.e., from a low to a high range of the engine speed.

The arcuate control surfaces 34c and 34d are not subjected to sliding contact with surfaces 38c and 38d of the guide recesses 38a and 38b during the movement of the first and second valve elements 34a and 34b between their closed and open positions. Therefore, the deposition of unburned products on the control surfaces 34c and 34d will not prevent the first and second valve elements 34a and 34b from smoothly moving into and out of the respective guide recesses 38a and 38b. It will be appreciated that the delay of exhaust port timing is preselected by the thickness of the valve elements 34a and 34b in the direction of the axis of the cylinder 16, and therefore this delay can be varied by changing the thickness of the valve elements 34a and 34b.

Figure 5:
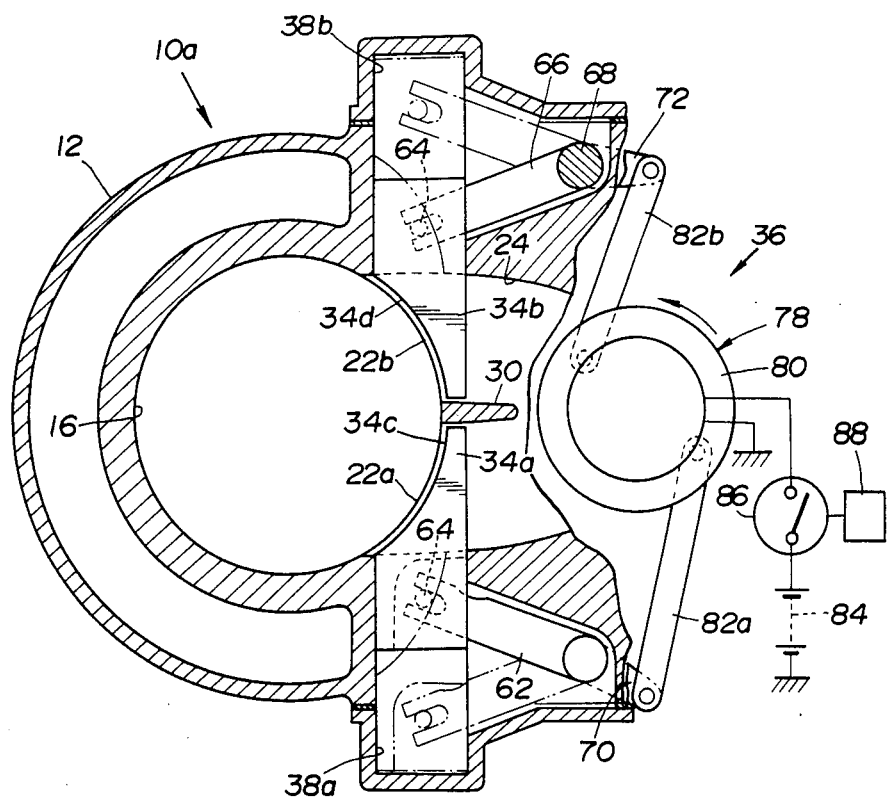
FIGS. 5 and 6 are views similar to FIG. 1 but showing modified engines.

FIG. 5 shows a modified two-cycle engine 10a which differs from the engine 10 of FIG. 1 in that the centrifugal governor 40 of the drive means 36 is replaced by a rotary solenoid 78. The rotary solenoid 78 comprises an output disc 80 for angular movement about an axis thereof in opposite directions, and a pair of links 82a and 82b pivotally connected at their one ends to the output disc 80 in diametrically opposed relation and pivotally connected at the other ends to the first and second levers 62 and 66, respectively. The rotary solenoid 78 is electrically connected to a power source 84 via a switch 86. A speed detector 88 for detecting the engine speed to produce a detecting signal is electrically connected to the switch 86. When the engine speed reaches a predetermined level, the switch 86 is responsive to the detecting signal from the speed detector 88 to be closed whereupon the output disc 80 is angularly moved in a direction R to move the first and second valve elements 34a and 34b from their respective closed to open positions.

Figure 6:
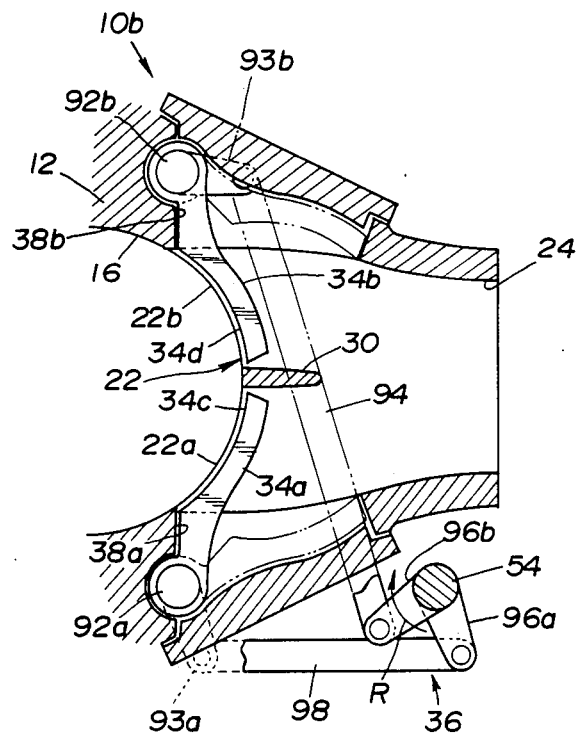

FIG. 6 shows another modified two-cycle engine 10b which differs from the engine 10 of FIG. 1 in that first and second elongated valve elements 34a and 34b are pivotal between their respective closed and open positions. More specifically, the first and second valve elements 34a and 34b are fixedly mounted at their outer ends respectively on a pair of pins 92a and 92b mounted on the cylinder block 12 for angular movement about their respective axes and extending parallel to the axis of the cylinder 16. A pair of recesses 38a and 38b are formed in the cylinder block 12 in opposed relation to each other and open to the exhaust passage 24. As described above in the preceding embodiments, each of the valve elements 34a and 34b has a timing control surface 34c, 34d of an arcuate concave shape formed in one side face facing the exhaust port 22 at an inner portion thereof. A curvature of each control surface 34c and 34d is substantially equal to or slightly greater than that of the inner peripheral surface of the cylinder 16. First and second driven levers 93a and 93b are fixedly connected at their one ends to the pins 92a and 92b, respectively. The other end of the second driven lever 93b is pivotally connected to one end of a link 94. First and second drive levers 96a and 96b are fixedly connected at their one ends to the output shaft 54 in angularly spaced relation. Opposite ends of a link 98 are pivotally connected respectively to the other end of the first drive lever 96a and the other end of the first driven lever 93a. The second drive lever 96b is pivotally connected at the other end to the other end of the link 94. The output shaft 54 is driven by the centrifugal governor 40 but may be operated by the rotary solenoid 78. Upon angular movement of the output shaft 54 in a direction R, each of the first and second valve elements 34a and 34b is pivotally movable about the respective pins 92a and 92b between a closed position where the first and second valve elements 34a and 34b are disposed in the exhaust passage 24 with their respective control surface 34c and 34d closing the upper end portions of the first and second portions 22a and 22b of the exhaust port 22, respectively, and an open position where the valve elements 34a and 34b are completely received in the recesses 38a and 38b, respectively. The first and second valve elements 34a and 34b are pivotally movable in a plane substantially perpendicular to the axis of the cylinder 16, each of the valve elements 34a and 34b having a uniform thickness in the direction of the axis of the cylinder 16.

FIGS. 7 to 10 show a further modified two-cycle engine 10c which is similar in construction and operation to the engine 10 of FIG. 1. A pair of coaxial guide tubes 100 and 102 are mounted on a cylinder block 12, and a pair of first and second elongated valve elements 34a and 34b are received respectively in the guide tubes 100 and 102 for sliding movement therealong. The common axis of the guide tubes 100 and 102 is disposed in a plane perpendicular to the axis of the cylinder 16.

Figure 8:
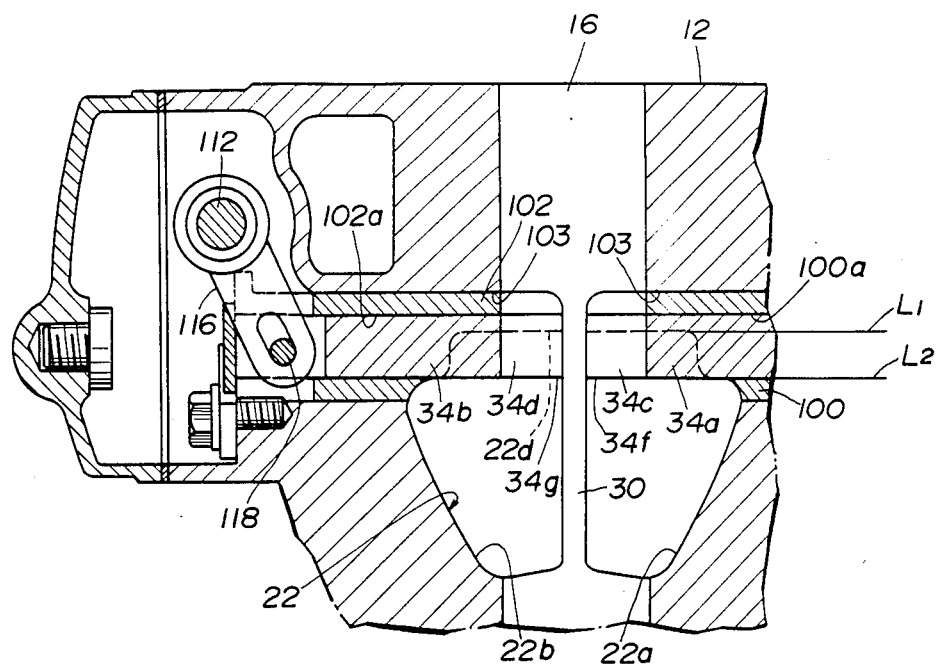
FIG. 8 is a fragmentary cross-sectional view taken along the line XIII—XIII of FIG. 7.

As described above for the engine 10 of FIG. 1, an elongated partition wall 30 extends between upper and lower portions of the wall of an exhaust passage 24 along the axis of the cylinder 16 and is disposed immediately adjacent to an exhaust port 22, so that the exhaust port 22 is divided by the partition wall 30 into a pair of first and second portions 22a and 22b which are juxtaposed circumferentially of the cylinder 16 and are disposed symmetrically with respect to the partition wall 30. The common axis of the guide tubes 100 and 102 is disposed perpendicular to the partition wall 30 as best shown in FIG. 8.

Each of the valve elements 34a and 34b has a timing control surface 34c, 34d of an arcuate concave shape formed in one side face facing the exhaust port 22 at an inner portion thereof. A curvature of each control surface 34c and 34d is substantially equal to or slightly greater than that of the inner peripheral surface of the cylinder 16.

As described above for the engine 10 of FIG. 1, each of the first and second valve elements 34a and 34b is movable between a closed position (FIG. 7) where their respective control surface 34c and 34d close the upper end portions of the first and second portions 22a and 22b of the exhaust port 22, respectively (FIG. 8), and an open position (FIG. 10) where their respective control surface 34c and 34d are held out of the exhaust passage 24 to open the upper end portions. In the closed positions of the first and second valve elements 34a and 34b, the first and second control surfaces 34c and 34d are smoothly continuous with the inner peripheral surface of the cylinder 16 and the surface of the partition wall 30 facing the cylinder. Also, in these closed positions, the inner ends of the first and second valve elements 34a and 34b are held in contact with the opposite side surfaces of the partition wall 30. That portion of the inner edge of each guide tube 100, 102 facing the exhaust port 22 is smoothly continuous with the inner peripheral surface of the cylinder 16.

Figure 9:
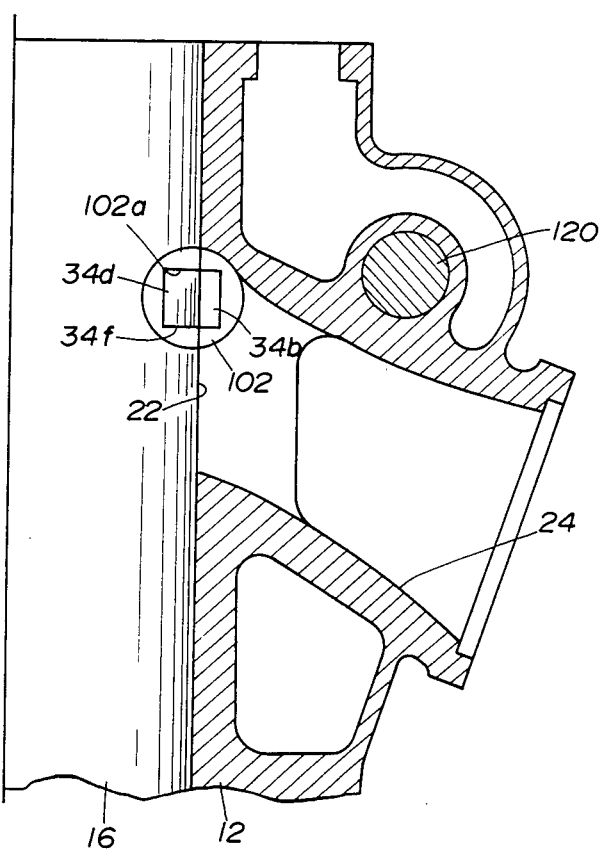
FIG. 9 is a cross-sectional view taken along the line IXIX of FIG. 7.
Figure 10:
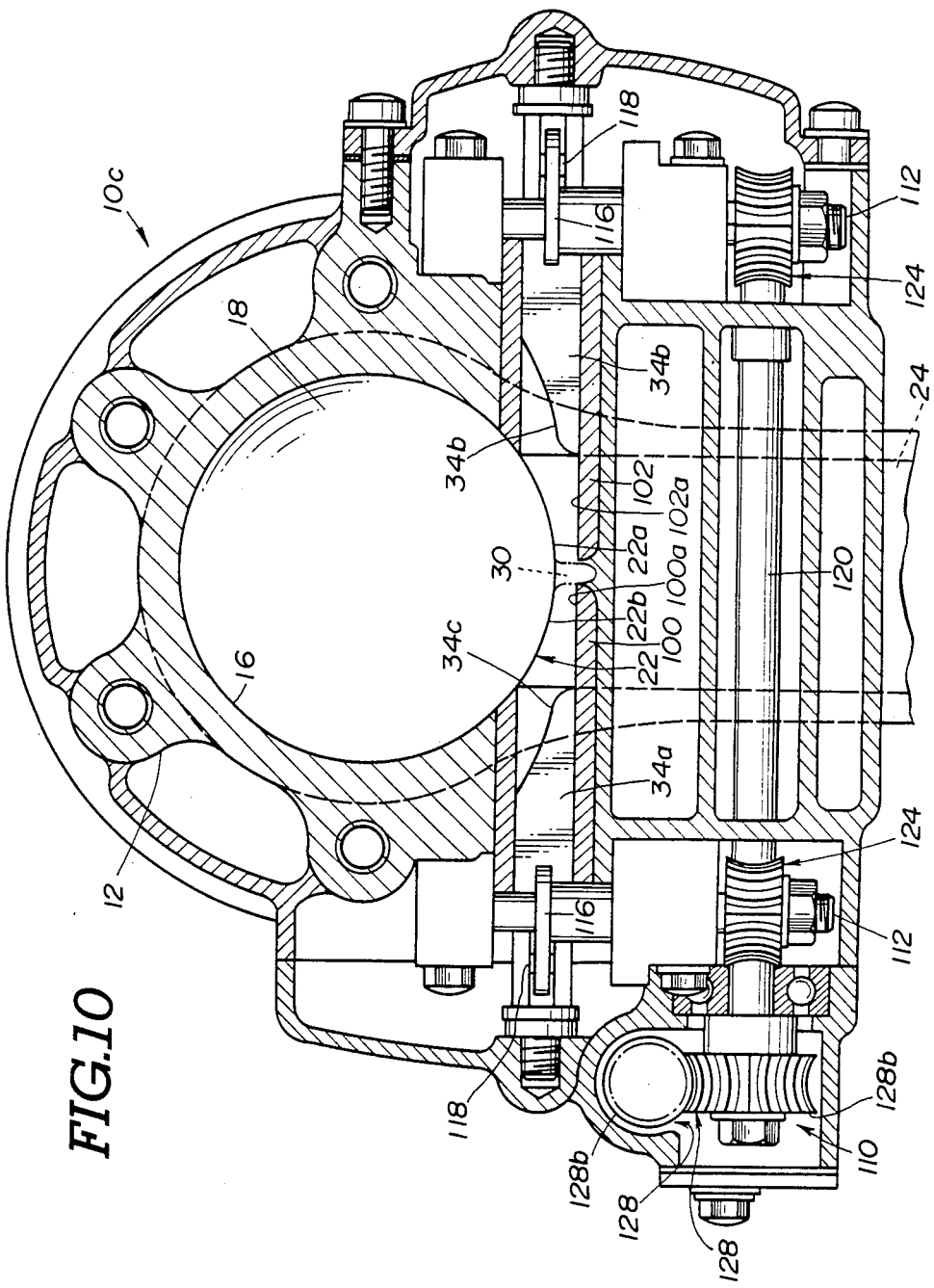
FIG. 10 is a view similar to FIG. 7 but showing a port timing control valve in its open position.

Each of the first and second elongated valve elements 34a and 34b is of a square cross-section as best seen in FIG. 9. Each of the guide tubes 100 and 102 has an outer cylindrical surface and an internal bore 100a, 102a of a square cross-section extending therethrough along an axis thereof. The cross-section of each of the first and second valve elements 34a and 34b is substantially complementary to the cross-section of a respective one of the internal bores 100a and 102a, and the valve elements 34a and 34b are slidable along a respective one of the bores 100a and 102a. In the closed positions of the valve elements 34a and 34b, the bottom surfaces 34f and 34g thereof are disposed parallel to the upper edge 22d of the exhaust port 22 which upper edge is disposed perpendicular to the axis of the cylinder 16 (FIG. 8).

The port timing control means further comprises a drive means 106 for driving the first and second valve elements 34a and 34b to move between their respective closed and open positions in accordance with the engine speed. The drive means 106 comprises an actuator 108 in the form of a servomotor, and a power transmission means 110 for transmitting an output of the actuator 108 to the valve elements 34a and 34b to move them between their respective closed and open positions. Reference numeral 88 designates a speed detector for detecting the engine speed to produce a detecting signal.

Figure 11:
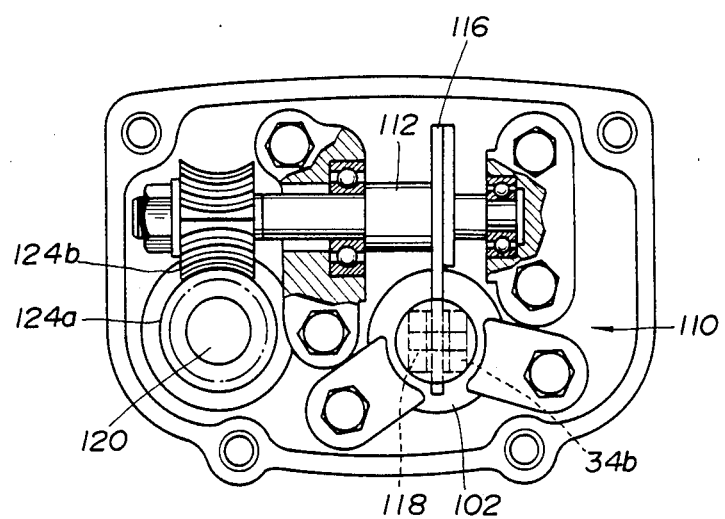
FIG. 11 is a cross-sectional view taken along the line XI—XI of FIG. 7.

The power transmission means 110 comprises a pair of output shafts 112 rotatably mounted on the cylinder block 12 through bearings 114, a pair of levers 116 pivotally connected at one ends respectively to the bifurcated outer ends of the valve elements 34a and 34b remote from the control surfaces 34c and 34d by a pair of pins 118 and fixedly secured at the other ends respectively to the output shafts 112 and 112, and a drive shaft 120 rotatably mounted on the cylinder block 12 through bearings 122 and 122 and connected to the output shafts 112 and 112 through a pair of worm gearings 124 and 124, a flexible joint 126 connected at one end to the output shaft of the actuator 108 and connected at the other end to the drive shaft 120 through a worm gearing 128. The worm gearing 128 comprises a worm 128a rotatably mounted on the cylinder block 12 and coupled to the flexible joint 126, and a gear 128b fixedly mounted on the drive shaft 120 and meshingly engaging the worm 128a. Each of the worm gearings 124 and 124 comprises a worm 124a (FIG. 11) fixedly mounted on the drive shaft 120, and a gear 124b fixedly mounted on a respective one of the output shafts 112 and 112 and meshingly engaging the worm 124a. The pitches of the two worms 124a and 124a on the drive shaft 120 are reverse, so that upon rotation or angular movement of the drive shaft 120, the two output shafts 112 and 112 are rotated in opposite directions. With this arrangement, upon rotation of the actuator 108, the first and second valve elements 34a and 34b are moved toward and away from each other, that is to say, between their respective closed and open positions through the power transmission means 110.

For mounting the guide tubes 100 and 102 and the valve elements 34a and 34b on the cylinder block 12, the guide tubes 100 and 102 are first forced into a pair of mounting holes 103 and 103 of a circular cross-section coaxially formed in the cylinder block 12. Then, the valve elements 34a and 34b are inserted into the cross-sectionally square internal bores 100a and 102a of the guide tubes 100 and 102, respectively. Since each of the mounting holes 103 and 103 has a circular cross-section, the processing of the cylinder block 12 to provide these holes can easily be carried out accurately. In addition, since the separate guide tubes 100 and 102 are employed, these guide tubes can easily be manufactured accurately.

In operation, when the engine speed reaches a predetermined level, the actuator 108 is responsive to the detecting signal from the speed detector 88 to move the first and second valve elements 34a and 34b from their respective closed to open positions through the power transmission means 110, as described above for the engine 10 of FIG. 1. In the closed positions of the valve elements 34a and 34b, the effective upper edge of the exhaust port 22 is lowered a distance equal to the thickness of the first and second valve elements 34a and 34b that is to say, from a level L1 representing the actual upper edge of the exhaust port 22 to a level L2 representing the lower surfaces 34f and 34g of the valve elements 34a and 34b (FIG. 8), thereby delaying the exhaust timing.

Figure 7:
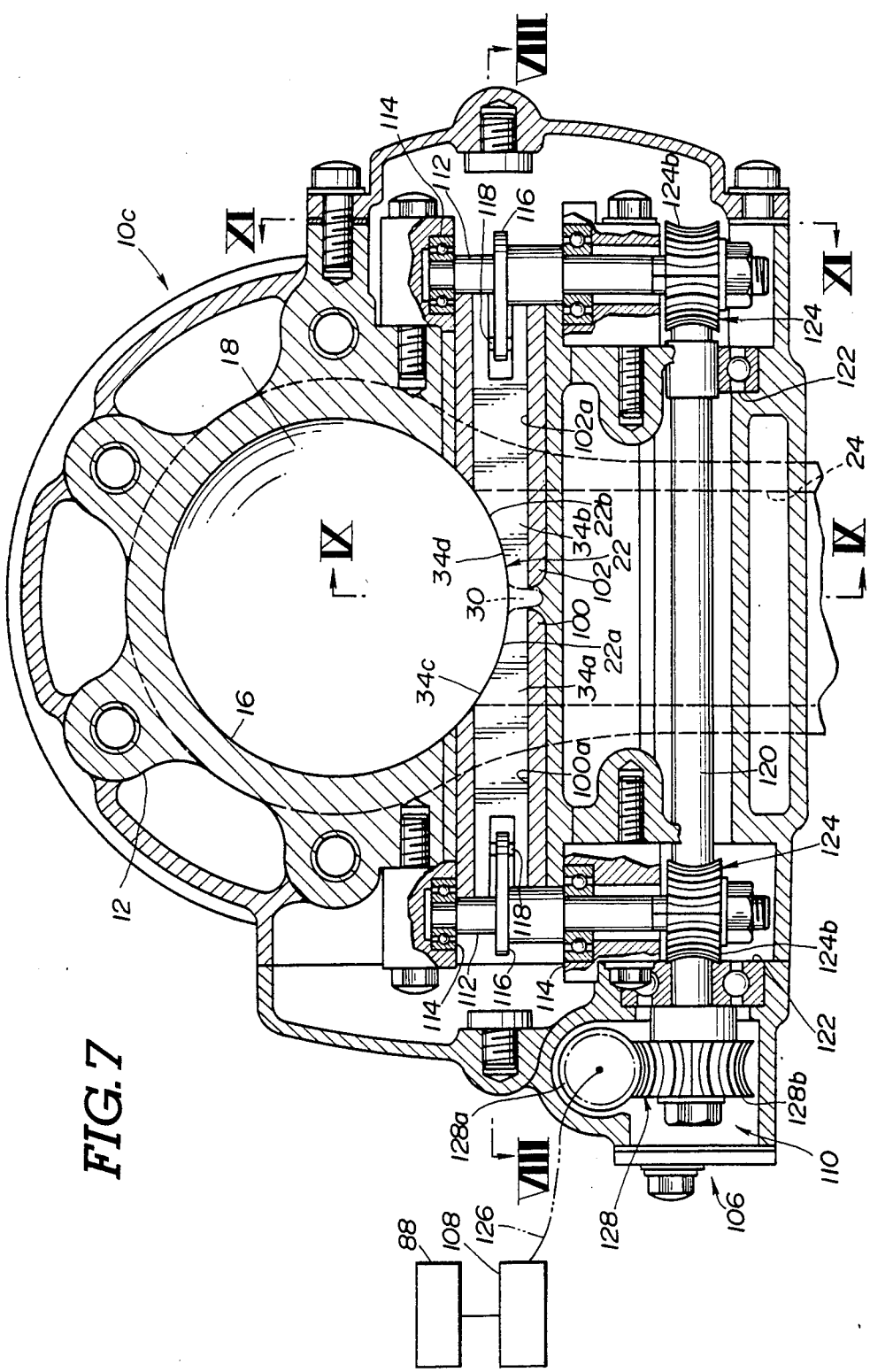
FIG. 7 is a view similar to FIG. 1 but showing a further modified engine.
Figure 12:
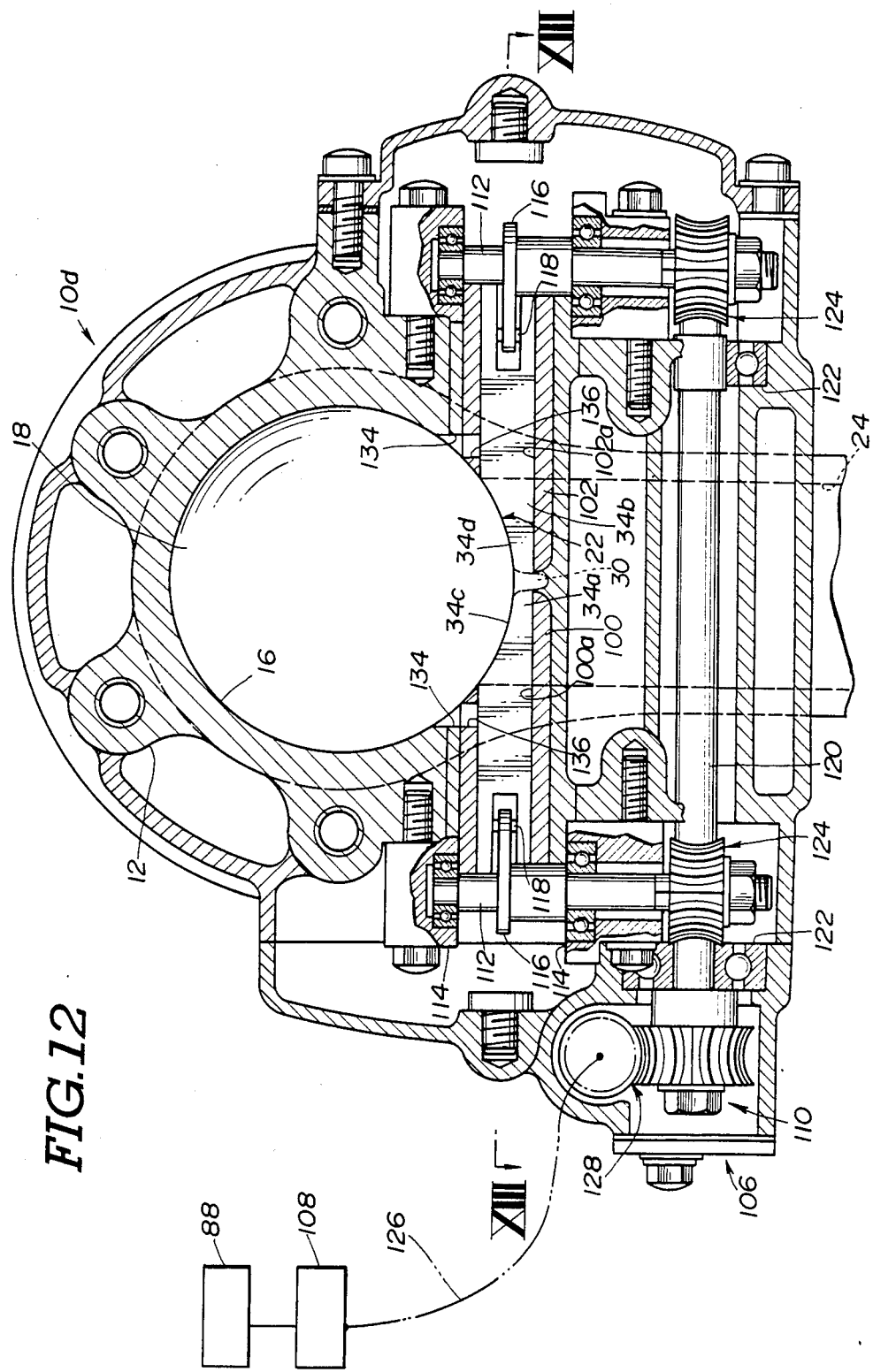
FIG. 12 is a view similar to FIG. 7 but showing a further modified engine.
Figure 13:
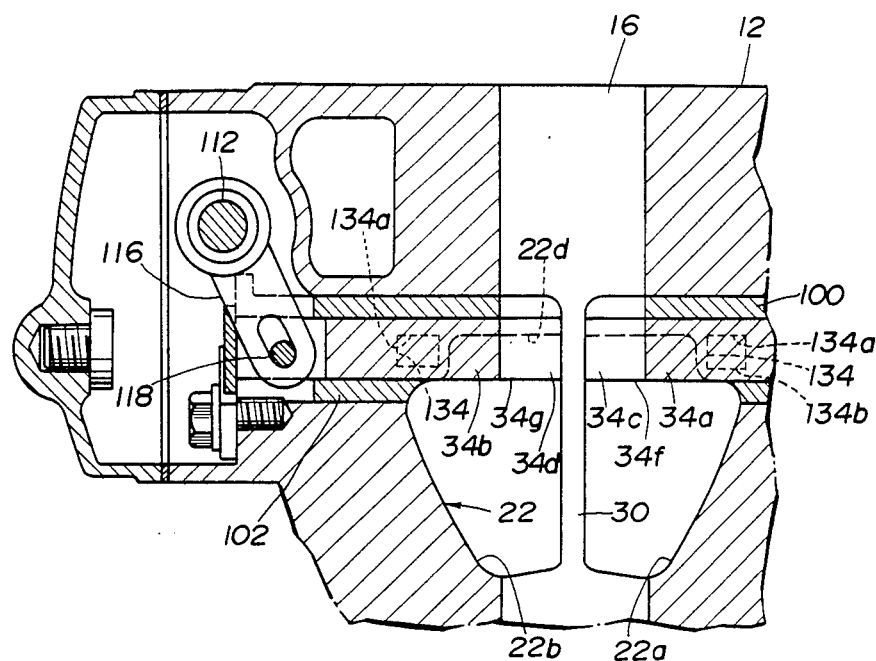
FIG. 13 is a cross-sectional view taken along the line XIII—XIII of FIG. 12.
Figure 14:
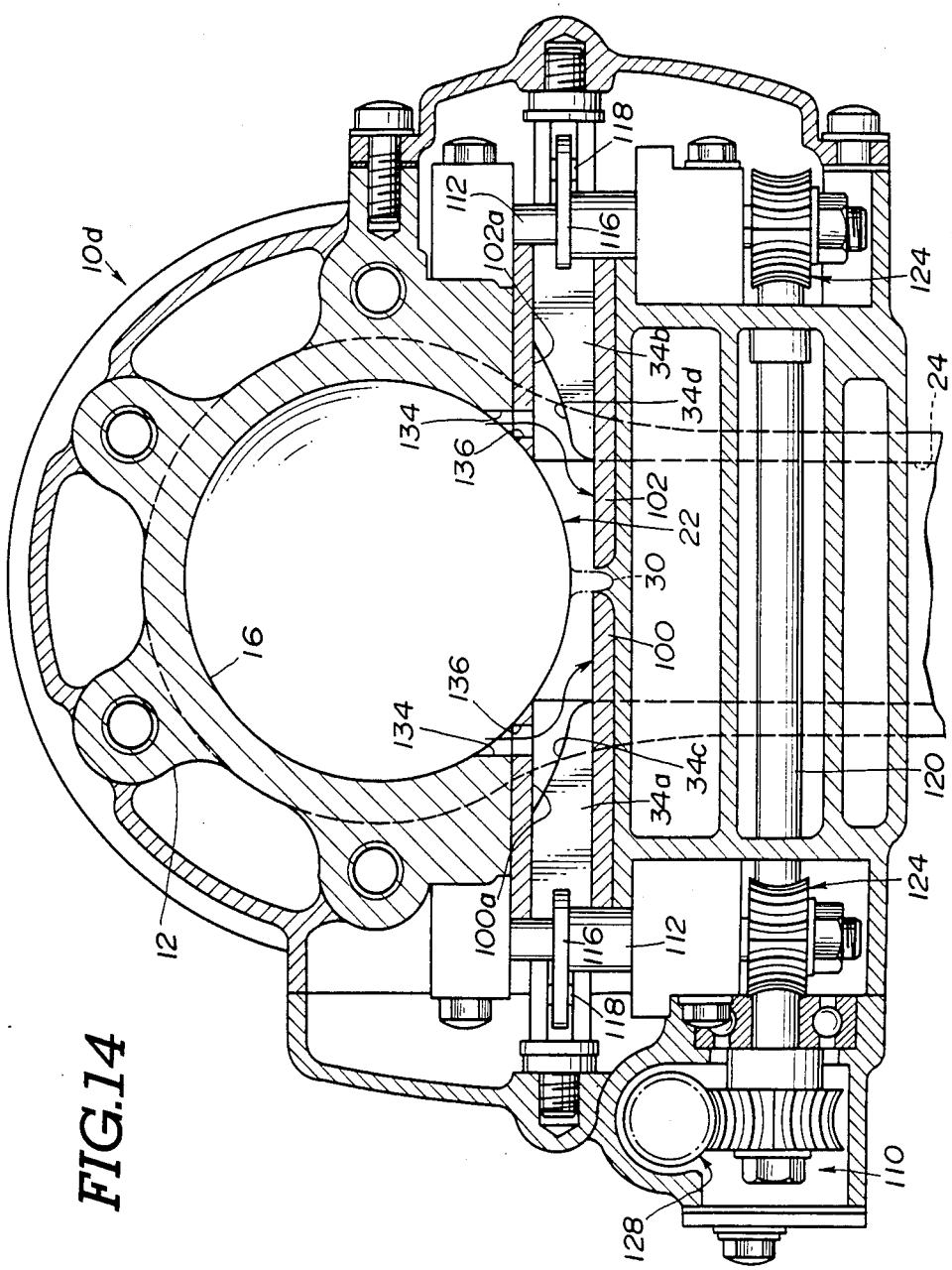
FIG. 14 is a view similar to FIG. 12 but showing a port timing control valve in its open position.

FIGS. 12 to 14 show a further modified two-cycle engine 10d which differs from the engine 10c of FIG. 7 in that a pair of auxiliary exhaust ports 134 and 134 are formed in the side wall of the cylinder 16 so as to be communicable with the exhaust passage 24. The auxiliary exhaust ports 134 and 134 are disposed on opposite sides of the exhaust port 22 adjacent thereto, the ports 134 and 134 being of a rectangular cross-section (FIG. 13) and extending perpendicular to the axis of the cylinder 16. The upper edge 134a of each auxiliary exhaust port 134 is disposed at the same level as the upper edge 22d of the exhaust port 22 while the lower edge 134b is disposed at a level above the lower surfaces 34f and 34g of the first and second valve elements 34a and 34b.

Each of the guide tubes 100 and 102 has an aperture 136 formed therethrough adjacent to its front edge continuous with the inner peripheral surface of the cylinder 16, each aperture 136 being aligned with and continuous with a respective one of the auxiliary ports 134 and 134.

As shown in FIG. 12, when the first and second valve elements 34a and 34b are in their respective closed positions, the pair of apertures 136 and 136 are closed respectively by those portions of the side faces of the first and second valve elements 34a and 34b disposed adjacent to their respective control surfaces 34c and 34d. Therefore, in this condition, the communication of the auxiliary exhaust ports 134 and 134 with the exhaust passage 24 is interrupted. On the other hand, as shown in FIG. 14, when the first and second valve elements 34a and 34b are in their respective open positions, the arcuate control surfaces 34c and 34d are disposed in opposed relation to the respective apertures 136 and 136, so that the auxiliary exhaust ports 134 and 134 are in communication with the exhaust passage 24 via the respective internal bores 100a and 102a of the guide tubes 100 and 102 as indicated by arrows.

By virtue of the provision of the auxiliary exhaust ports 134 and 134, the overall exhaust port area is increased, so that a good exhaust can be achieved in a high range of the engine speed.

Figure 15:
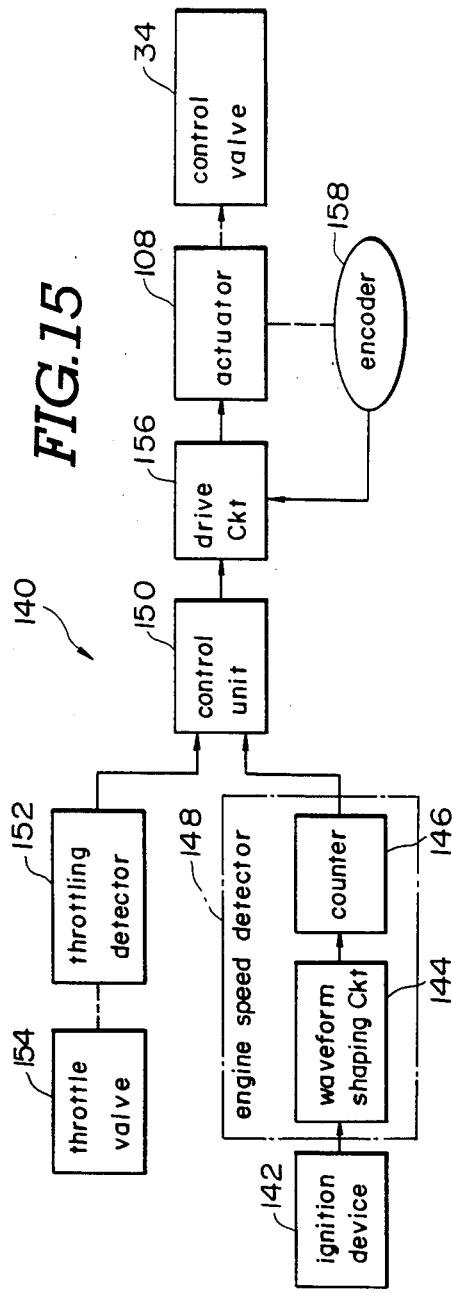
FIG. 15 is a block diagram of a valve control system.

FIG. 15 shows a block diagram of a valve control system 140 for controlling the port timing control valve 34 in the engines 10c and 10d. The valve control system 140 serves as decompression means for reducing the pressure in the cylinder 16 on compression stroke at the start of the engine. As described above, the control valve 34 is in its closed position at low engine speeds to delay the exhaust port timing to increase the effective compression stroke of the piston 18. On the other hand, in the open position of the control valve 34, the effective compression stroke of the piston 18 is decreased. With this method, the power output characteristics of the engine are improved. However, much torque is required for starting the engine since the control valve 34 is in its closed position at the start of the engine. The valve control system 140 enables the engine to be started without requiring undue torque.

Figure 16:
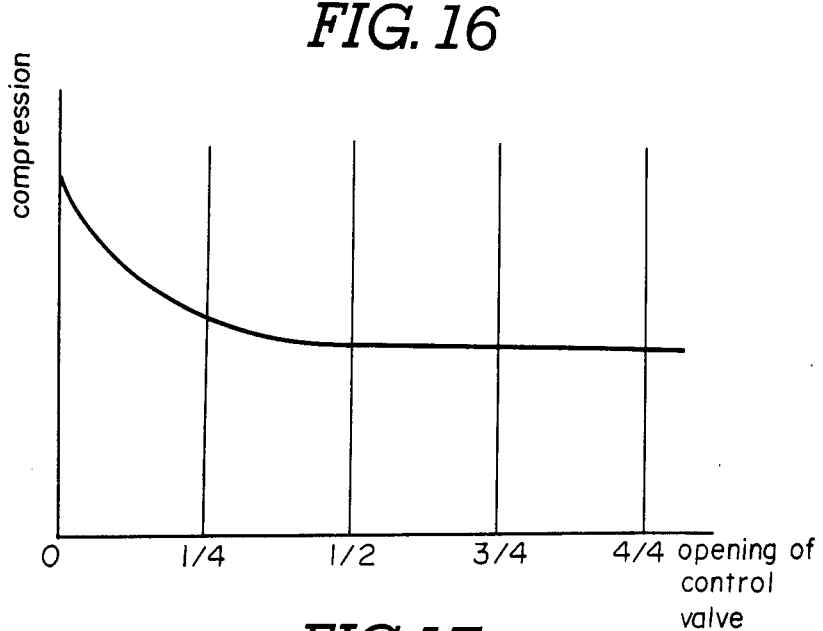
FIG. 16 is a graph showing the relation between the pressure in the cylinder and the opening of the control valve.
Figure 17:
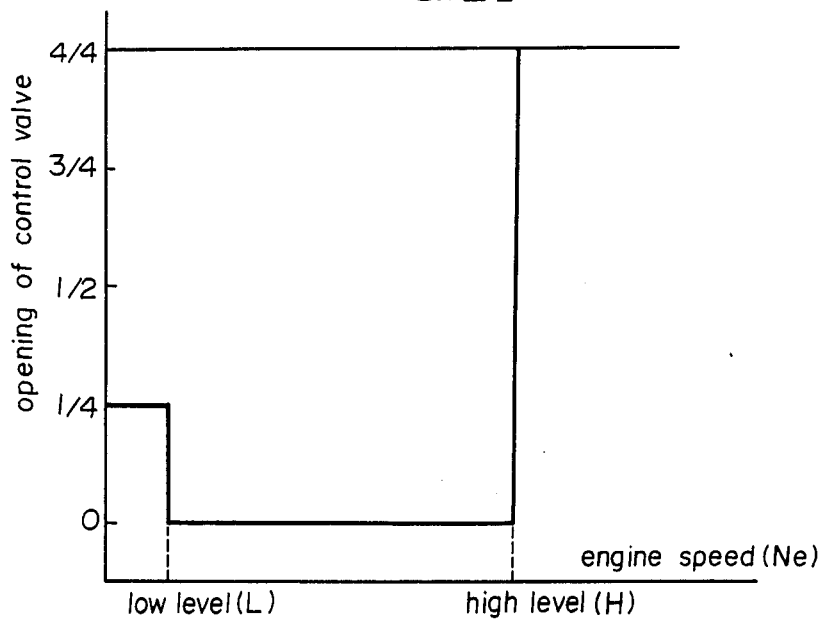
FIG. 17 is a graph showing the relation between the opening of the control valve and the engine speed.

As shown in FIG. 16, the compression in the cylinder 16 is the maximum when the control valve 34 is in its fully closed position, that is to say, the degree of opening of the valve 34 is zero. And, the compression in the cylinder 16 decreases with an increase in the degree of opening of the valve 34. After the opening degree exceeds ¼, the compression in the cylinder 16 becomes generally constant. Therefore, where the opening degree is at least 4/1, satisfactory results can be achieved. In view of these, with the valve control system 140, when the engine speed is in the range of between 0 and a predetermined low level L (FIG. 17), the degree of opening of the valve 34 is not less than ¼. In the range of between more than the lower point L and a predetermined high level H, the opening degree is zero (i.e., the valve 34 is in its fully closed position). And, in the range of above the high level H, the opening degree is 1 (4/4), that is to say, the valve is in its fully opened condition.

The valve control system 140 will now be described with reference to FIG. 15. An ignition device 142 generates a pulse signal per revolution of the engine, the pulse signal being applied to a waveform shaping circuit 144 by which it is shaped. An output signal from the waveform shaping circuit 144 is fed to a counter 146, the contents of the counter 146 representing the engine speed. The waveform shaping circuit 144 and the counter 146 constitute a detector 148 for detecting the engine speed to output a signal to a control unit 150 such as a microprocessor unit. A detector 152 detects the amount Th of throttling of a throttle valve 154 to output a signal to the control unit 150, the throttle valve 154 controlling the flow of the air-fuel mixture to the engine in response to the operation of an accelerator means such as a throttle grip and an accelerator pedal. The control unit 150 calculates a target value of the opening of the control valve 34 from the engine speed Ne and the throttling amount Th of the throttle valve in accordance with a program incorporated in the control unit 150. The control unit 150 outputs a signal representative of the target value to a drive circuit 156. An encoder 158 is connected to an output shaft of the actuator or servomotor 108 for detecting the position of rotation or angular movement of the servomotor 108 to feed an output signal to the drive circuit 156. The drive circuit 156 drives the actuator 108 until the output of the encoder 158 is brought into agreement with the target value, that is to say, the degree of the opening of the control valve 34 is brought into agreement with the amount of the opening thereof represented by the target value.

Figure 18:
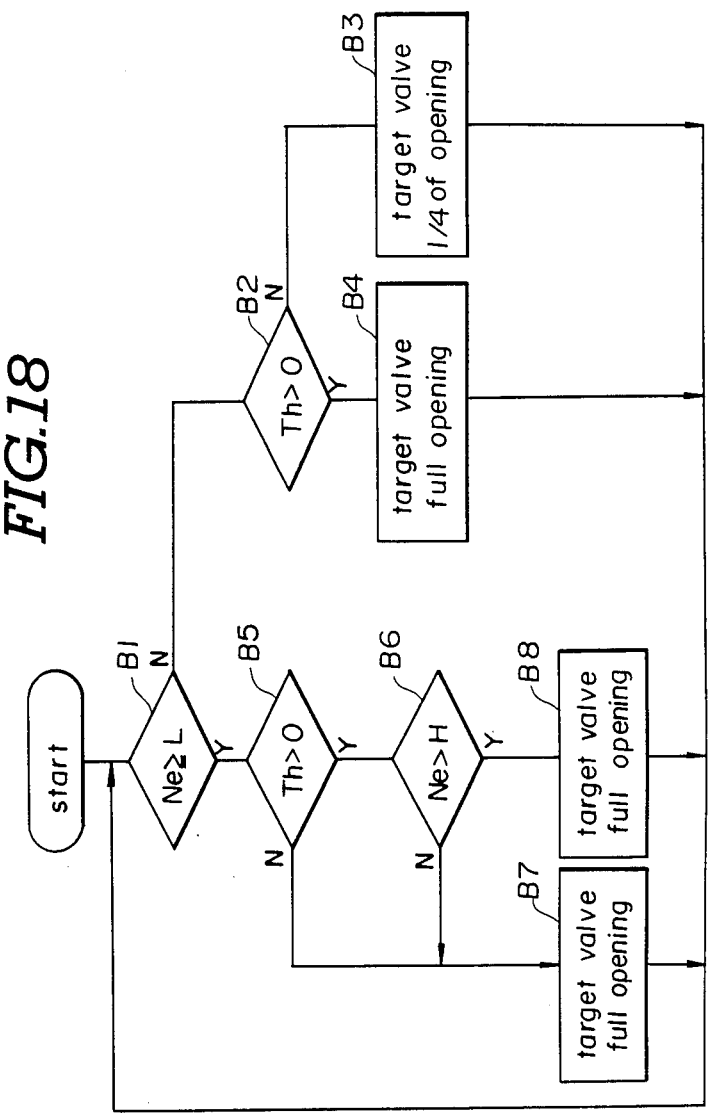
FIG. 18 is a flow chart of the operation of the valve control system.

The operation of the valve control system 140 will now be described with reference to a flow chart (FIG. 18) of the program for effecting the operation of the system 140.

The engine speed at the start of the engine, i.e., the low level L (FIG. 17) mentioned above, is, for example, 750 rpm. First, when the engine is started, pulse signals are fed from the ignition device 142 to the engine speed detector 148, so that the control unit 150 inputs thereto the output of the counter 146 representative of the engine speed Ne at a predetermined time interval. In Block B1, the control unit 150 determines whether the engine speed Ne reaches the low level L (750 rpm). If the result is "NO", the processing proceeds to Block B2 in which the control unit 150 determines whether the throttling amount Th of the throttle valve 154 is more than zero. If the result is "NO", that is to say, the throttling amount Th is zero, the processing proceeds to Block B3 in which the control unit 150 feeds the output signal or target value representative of not less than ¼ of the opening of the control valve 34. On the other hand, in Block B2, if the throttle amount Th is more than zero, the processing proceeds to Block B4 in which the control circuit 150 feeds the output signal or target value representative of 4/4 of the opening of the control valve 34, that is to say, the full opening thereof.

Thus, the first and second valve elements 34a and 34b are moved from their respective closed positions in accordance with the target value, so that the effective compression stroke of the piston 18 is reduced, thereby reducing the torque required for starting the engine.

Then, when the engine speed Ne reaches the low level L and is not more than the high level H (FIG. 17), the target value or the output of the control unit 150 represents "0" of the opening of the control valve 34, that is to say, the full closing thereof, regardless of the throttling amount Th of the throttle valve 154 (Blocks B5 to B7). Therefore, the first and second valve elements 34a and 34b are moved to their respective closed positions. On the other hand, when the engine speed Ne exceeds the high level H (Block B6), the control unit 150 feeds the output or target value representative of 4/4 of the opening of the control valve 34, that is to say, the full opening thereof. Therefore, the first and second valve elements 34a and 34b are moved to their respective open positions.

Figure 19:
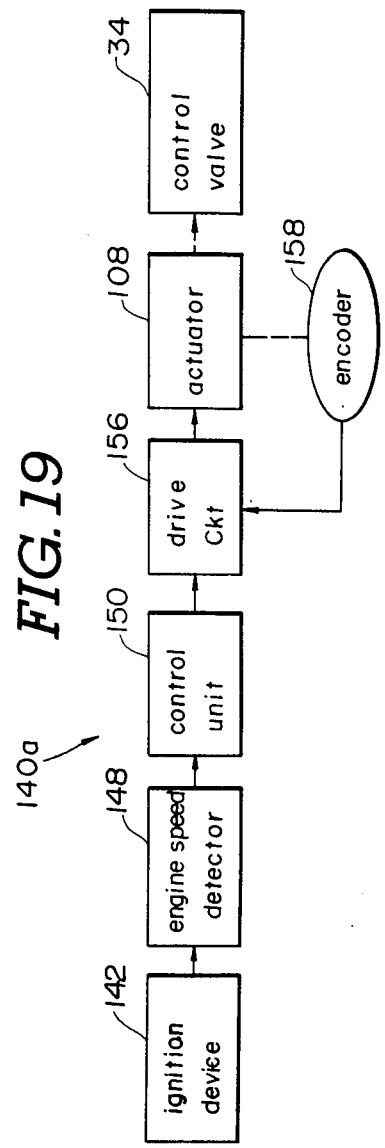
FIG. 19 is a block diagram of a modified valve control system.

FIG. 19 shows a block diagram of a modified valve control system 140a which differs from the valve control system 140 of FIG. 15 in that the throttling detector 152 is omitted. More specifically, when the engine speed Ne is less than the predetermined low level L, the control unit 150 outputs the target value representative of the opening of the control valve 34. When the engine speed Ne reaches the low level L and is not more than the high level H, the target value or the output of the control unit 150 represents "0" of the opening of the control valve 34, that is to say, the full closing thereof. When the engine speed exceeds the high level H (Block B6), the control unit 150 feeds the output or target value representative of the opening of the control valve 34, that is to say, the full opening thereof.

Figure 20:
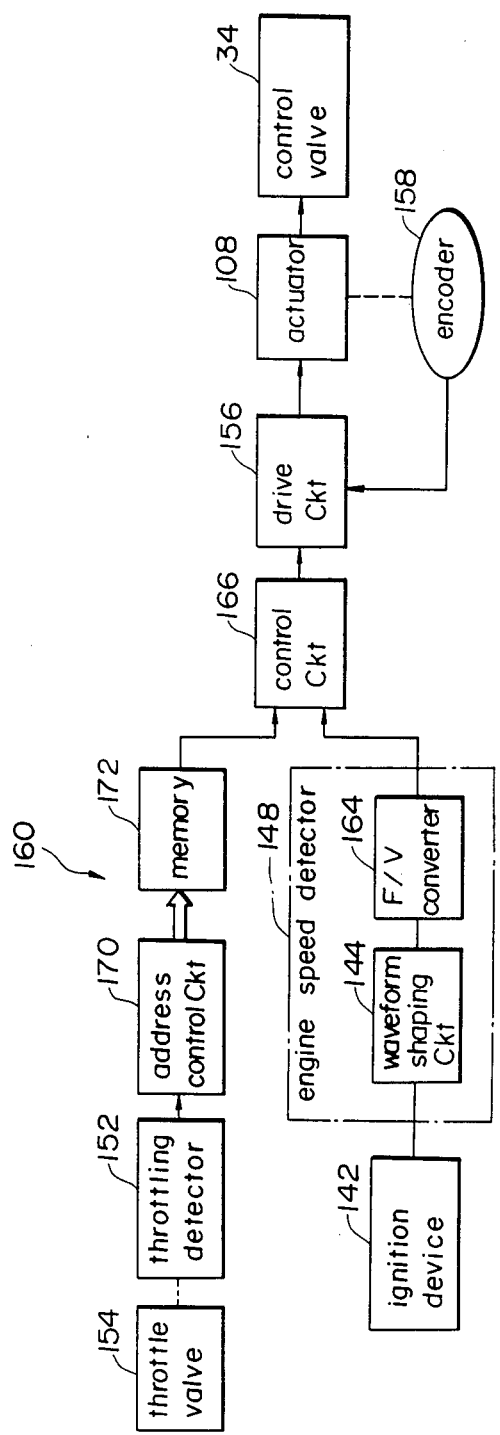
FIG. 20 is a block diagram of another type of valve control system.
Figure 21:
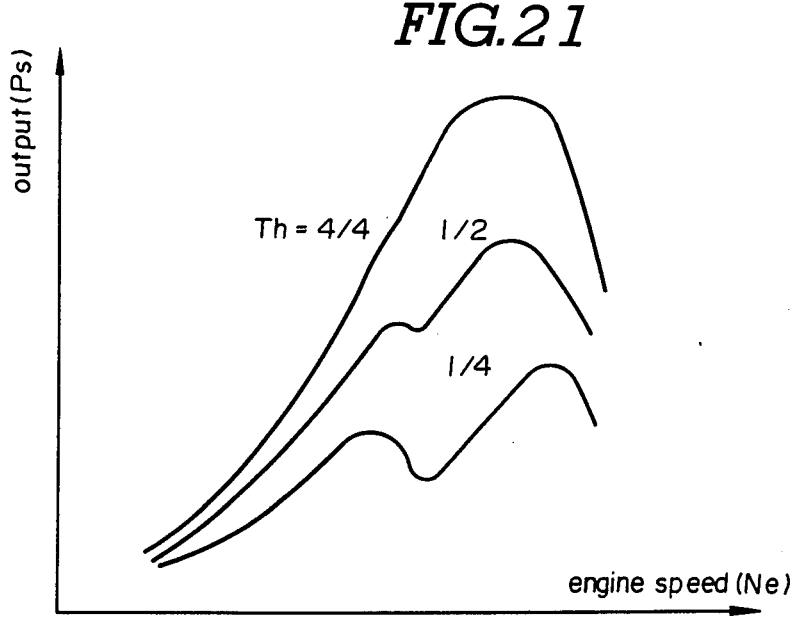
FIG. 21 is a graph showing power output characteristics of a conventional engine.

FIG. 20 shows a block diagram of a valve control system 160 for controlling the opening of the control valve 34 in the engines 10c and 10d. In the engines 10c and 10d, the control valve 34 is switched from its closed to open position when the engine speed reaches a predetermined level regardless of the amount Th of throttling of a throttle valve 154, the throttle valve controlling the flow of the air-fuel mixture to the engine in response to the operation of an accelerator means such as a throttle grip and an accelerator pedal. Therefore, as the amount Th of throttling of the throttle valve 154 decreases, power output characteristics of the engine becomes irregular, as shown in FIG. 21.

An ignition device 142 generates a pulse signal per revolution of the engine, the pulse signal being applied to a waveform shaping circuit 144 by which it is shaped. An output signal from the waveform shaping circuit 144 is fed to an F/V converter 164 which converts the frequency of the pulses into voltage and outputs data, representative of the voltage corresponding to the engine speed, the output data being fed to a control unit 166 such as a microprocessor unit. The waveform shaping circuit 144 and the converter 164 constitute a detector 168 for detecting the engine speed. A detector 152 detects the amount of throttling of the throttle valve 154 to output a signal to an address control circuit 170. The throttling detector 152 is composed of a 3-bit encoder operatively connected to the throttle valve 154. A memory 172 stores valve-switching data representative of the optimum values of the engine speed at various amounts of throttling of the throttle valve 154 at which values the control valve 34 should be switched from one of its closed and open positions to the other to render the power output characteristics smooth, the valve-switching data being determined through experiments. The address control circuit 170 outputs address data to the memory 172 to access the addresses thereof to read the valve-switching data therefrom. Thus, the data representative of the optimum value of the engine speed and the data representative of the actual engine speed are fed to the control unit 166, and in accordance with these data, the control unit 166 determines a target value of the opening of the control valve 34, the target value representing either the full closing or full opening of the valve 34. The control unit 166 outputs a signal representative of the target value to a drive circuit 156. An encoder 158 is connected to an output shaft of the actuator or servomotor 108 for detecting the position of rotation or angular movement of the servomotor 108 to feed an output signal to the drive circuit 156. The drive circuit 156 drives the actuator 108 until the output of the encoder 158 is brought into agreement with the target value, that is to say, the degree of the opening of the control valve 34 is brought into agreement with the amount of the opening thereof represented by the target value.

Figure 22:
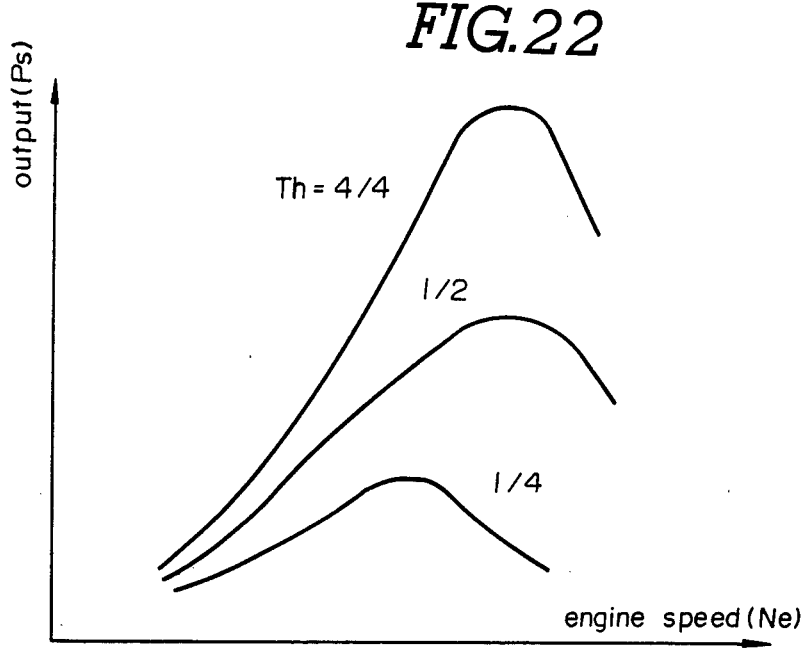
FIG. 22 is a graph showing power output characteristics of the engine incorporating the valve control system of FIG. 20.

In operation, when the engine speed reaches the predetermined level and when the throttle valve 154 is opened to a certain extent, the amount of throttling of the valve 154 is detected by the throttling detector 152. Then, the valve-switching data is read from that address of the memory 172 corresponding to the throttling amount, and is fed to the control unit 166. Then, the control unit 166 compares the valve-switching data with the data outputted from the engine speed detector 148 to determine whether the target value of the opening of the control valve 34 should represent the full opening or full closing of the control valve 34. If the target value represents the full opening of the valve 34, in which case generally the engine speed is high, the first and second valve-elements 34a and 34b are moved to their respective open positions through the actuator 108. On the other hand, if the target value represents the full closing of the valve 34, the first and second valve elements 34a and 34b are moved to their respective closed positions. Thus, in this embodiment, the control valve 34 is controlled depending on two parameters, that is, the amount of throttling of the throttle valve 154 and the engine speed, a smooth power output characteristics can be achieved as shown in FIG. 22.

FIG. 23 shows a further modified two-cycle engine 10e which differs from the engine 10 of FIG. 1 in that a single valve element 34a of a port timing control valve 34 is employed and in that a modified drive means 106 is provided for moving the valve element 34a between its closed and open positions. The valve element 34a has a timing control surface 34c of an arcuate concave shape formed in one side face facing an exhaust port 22 at an inner portion thereof. A curvature of the control surface 34c is substantially equal to or slightly greater than that of the inner peripheral surface of the cylinder 16.

In its closed position of the valve element 34a, the control surface 34c is smoothly continuous with the inner peripheral surface of the cylinder 16 as described in the preceding embodiments. And, in its open position, the valve element 34a is held out of the exhaust passage 24 and received in a recess 38 formed in the cylinder block 16. A guide hole 39 is formed in the cylinder block 12 and leads to the recess 38 at one end and to the exhaust passage 24 at the other end. The valve element 34a is closed fitted in the guide hole 39 for sliding movement therealong. The drive means 106 comprises an actuator 108 in the form of a servomotor, and a power transmission means 110 which comprises an output shaft 44 mounted on the cylinder block 16 for angular movement about an axis thereof extending along the axis of the cylinder 16, and a lever 62 fixedly mounted at one end on the shaft 44 and having at the other end a slot 62c in which a pin 34g, secured to the end of the valve element 34a remote from the control surface 34a, is received. The power transmission means 110 further comprises a flexible joint 126 connected at one end to an output shaft of the actuator 108 and also connected at the other end to the drive shaft 44 via a worm gearing (not shown) or the like. With this construction, upon actuation of the actuator 108, the lever 62 is angularly moved about the axis of the drive shaft 44 for moving the valve element 34a between its closed and open positions along a straight path in a plane substantially perpendicular to the axis of the cylinder 16.

The cylinder block 12 has a hollow projection 176 in which the recess 38 is formed and in which part of the power transmission means 110 is accommodated, the projection 176 extending generally raidally outwardly from a cylinder block body 12a. In the preceding embodiments, two such projections are provided on the cylinder block. Thus, the engine 10e in this embodiment is compact in size because of the provision of the single valve element 34a.

Figure 24:
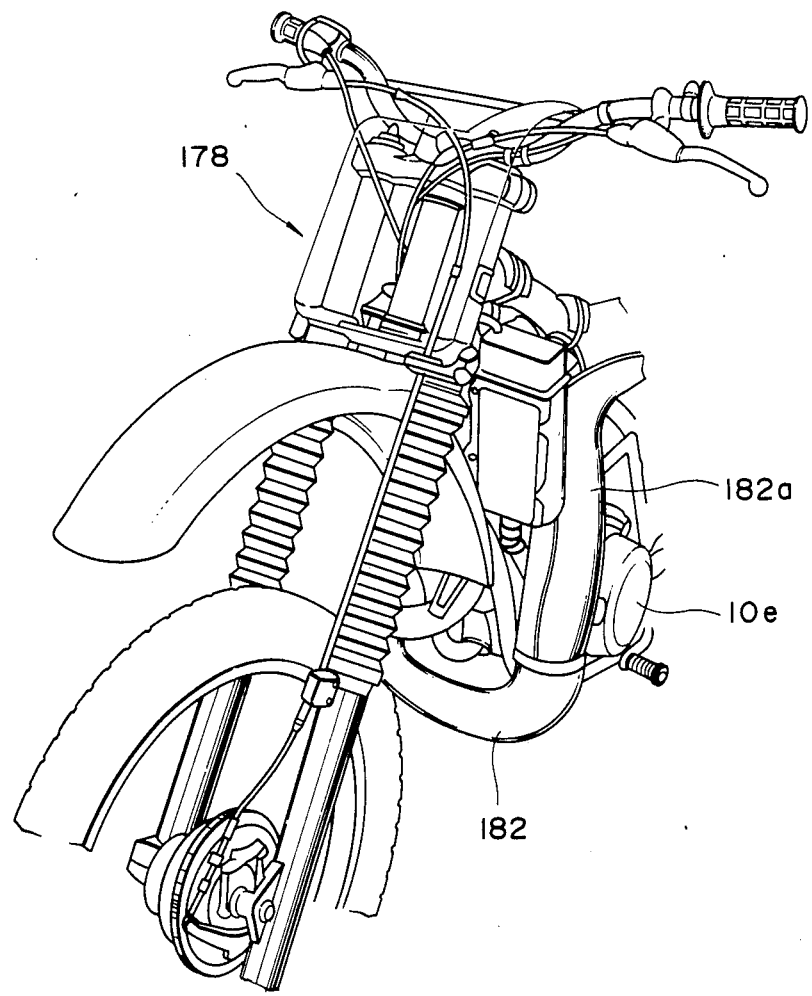
FIG. 24 is a perspective view of a motorcycle incorporating the engine of FIG. 23.

FIG. 24 shows a motorcycle 178 incorporating the engine 10e of FIG. 23, the engine 10e being mounted on a body 180. An exhaust pipe 182 extending from the exhaust passage 24, and that portion 182a of the exhaust pipe 182 forming an exhaust chamber is disposed adjacent to the engine 10e on that side of the cylinder 16 opposite to the projection 176. With this arrangement, the exhaust pipe 182 can be positioned closer to the engine a distance D than an exhaust pipe 182b which would be incorporated in the engine 10 of FIG. 1.

Figure 25:
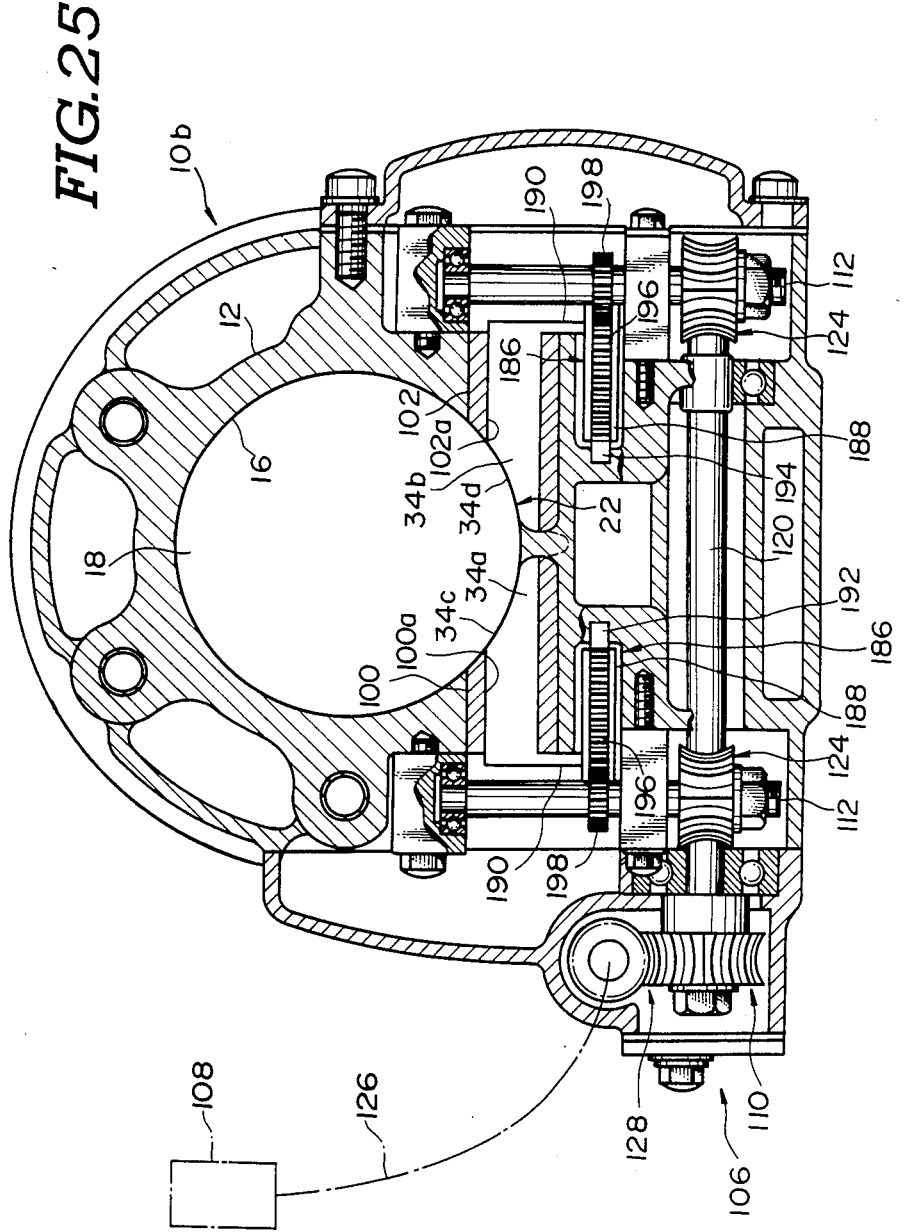
FIG. 25 is a cross-sectional view of a further modified engine.
Figure 26:
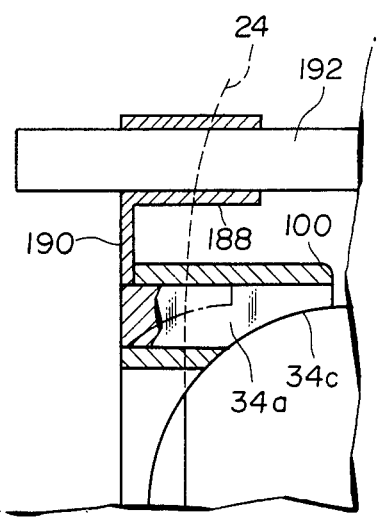
FIG. 26 is a fragmentary cross-sectional view of the engine of FIG. 25.

FIG. 25 shows a further modified two-cycle engine 10f which differs from the engine 10c of FIG. 7 in that guide means 186 is provided for guiding the movement of first and second valve elements 34a and 34b between their respective closed and open positions. The first and second valve elements 34a and 34b are similar in configuration to those in the embodiment of FIG. 7 except that the former is shorter than the latter. In addition, as best shown in FIG. 26, each of the first and second valve elements 34a and 34b has an integral tubular slider portion 188 extending parallel to the body thereof, and a connecting arm 190 extending from the end of the body remote from the control surface 34c, 34d and interconnecting the body and the slider portion 188. The guide means 186 comprises a pair of coaxial guide rods 192 and 194 of a circular cross-section fixedly mounted on the cylinder block 12 and extending parallel to guide tubes 100 and 102, and the tubular slider portions 188 of the valve elements 34a and 34b fitted on the guide rods 192 and 194 respectively, for sliding movement therealong. Each of the slider portions 188 has a rack portion 196 on a upper surface thereof. In this embodiment, instead of the levers 116 in the embodiment of FIG. 7, a pair of first and second pinions 198 are fixedly mounted on the output shafts 112 and 112 and meshingly engage the rack portions 196 and 196 on the slider portions 188 and 188, respectively. Upon rotation of the output shafts 112 and 112, the first and second valve elements 34a and 34b are moved between their respective closed and open positions, as described above for the preceding embodiments.

By virtue of the provision of the guide rods 192 and 194 and the slider portions 188 and 188, the valve elements 34a and 34b and the guide tubes 100 and 102 can be substantially reduced in length without affecting the accurate sliding movement of the valve elements 34a and 34b along the respective guide tubes 100 and 102. Therefore, the overall width of the engine 10f can also be substantially reduced, so that the engine 10f can be of a compact size. More specifically, although the areas of sliding contact of each guide tube 100, 102 with a respective one of the first and second valve elements 34a and 34b are reduced, the cooperation of the slider portions 188 and 188 with the respective guide rods 192 and 193 positively prevent the first and second valve elements 34a and 34b from rattling during the movement thereof between their respective closed and open positions. As described above for the embodiment of FIG. 7, since the first and second valve elements 34a and 34b of a square cross-section are slidably received respectively in the cross-sectionally square bores 100a and 102a of the guide tubes 100 and 102, the valve elements 34a and 34b are prevented from rotation or angular movement along the axis thereof.

Figure 27:
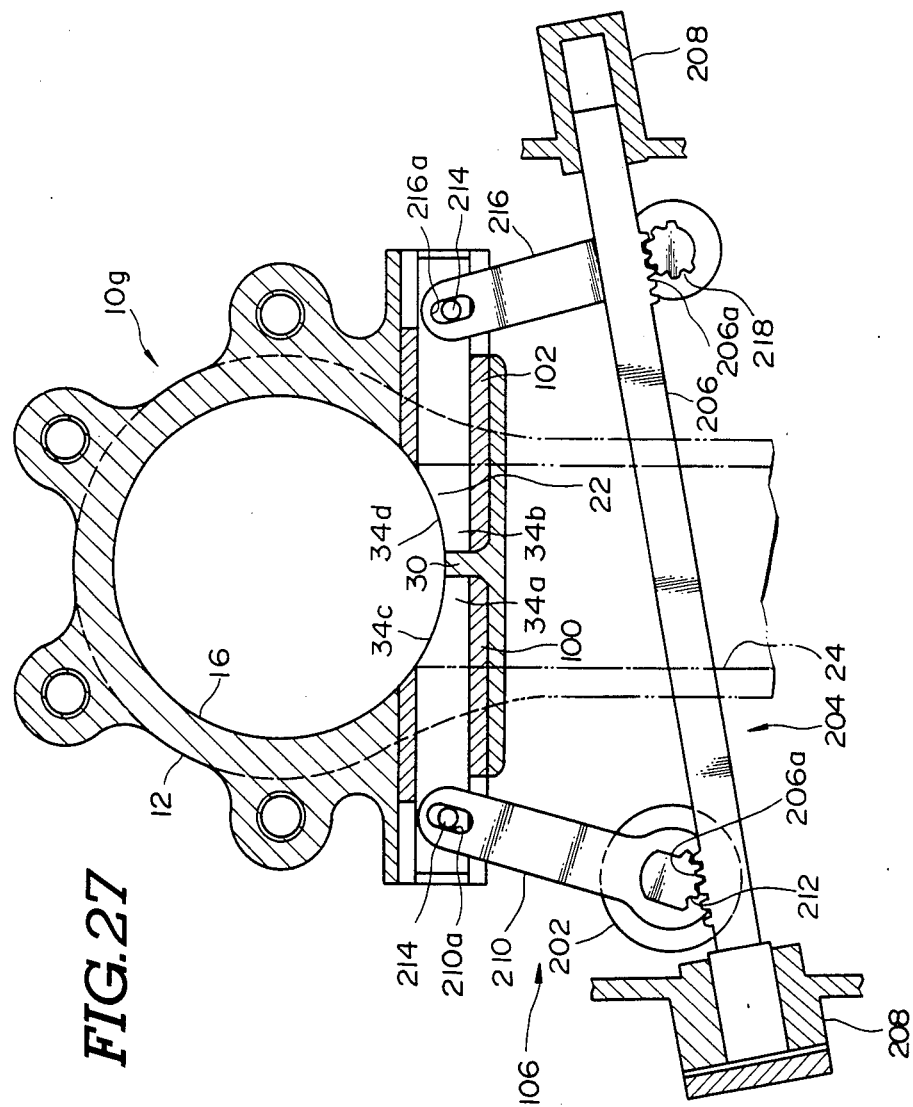
FIGS. 27 and 28 are cross-sectional views of further modified engines.

FIG. 27 shows a further modified two-cycle engine 10g which differs from the engine 10c of FIG. 7 in that modified drive means 106 is provided for moving the first and second valve elements 34a and 34b between its closed and open positions. The drive means 106 comprises an actuator 202 in the form of a servomotor mounted on the cylinder block 12, and power transmission means 204 for transmitting the output of the actuator 202 to the first and second valve elements 34a and 34b for moving them between its respective closed and open positions. The power transmission means 204 comprises a drive rod 206 borne at its opposite ends by a pair of bearings 208 and 208 for movement along an axis thereof. The drive rod 206 has a square cross-section, and the opposite ends of the drive rod 206 are slidably received respectively in complementarily-shaped bores of the bearing 208 and 208, so that the drive rod 206 is prevented from rotating about its axis. A first lever 210 is fixedly mounted at one end on a rotatable output shaft (not shown) of the actuator 202, and a first pinion 212 is fixedly secured to the upper end of the output shaft. The first lever 210 has at the other end a slot 210a in which a pin 214 secured to the first valve element 34a is received. A second lever 216 is fixedly mounted at one end on a shaft (not shown) rotatably mounted on the cylinder block 12, and a second pinion 218 is secured to the upper end of this shaft. The second lever 216 has at the other end a slot 216a in which a pin 214 secured to the second valve element 34b is received. The drive rod 206 has a pair of rack portions 206a and 206a on opposite sides thereof adjacent to the opposite ends thereof. The first and second pinions 212 and 218 are in mesh with the rack portions 206a and 206a, respectively.

In operation, upon rotation or angular movement of the output shaft of the actuator 202 in a counter-clockwise direction (FIG. 27), the first lever 210 is angularly moved in a counter-clockwise direction, and simultaneously the drive rod 206 is moved in a right-hand direction through the first pinion 212 and the rack portion 206a in mesh therewith to angularly move the second lever 216 in a clockwise direction through the second pinion 218 and the rack portion 206a in mesh therewith, so that the first and second valve elements 34a and 34b are simultaneously moved away from each other, that is to say, from their respective closed to open positions. Since the drive rod 206 is adapted to be moved linearly, the first and second levers 210 and 216 can be angularly moved accurately in synchronism with each other, so that the first and second valve elements 34a and 34b are also accurately moved between their respective closed and open positions. In this embodiment, although the actuator 202 is coupled to the first lever 210, a suitable actuator such as a solenoid may be directly connected to the drive rod 206 for driving the same along the axis thereof.

Figure 28:
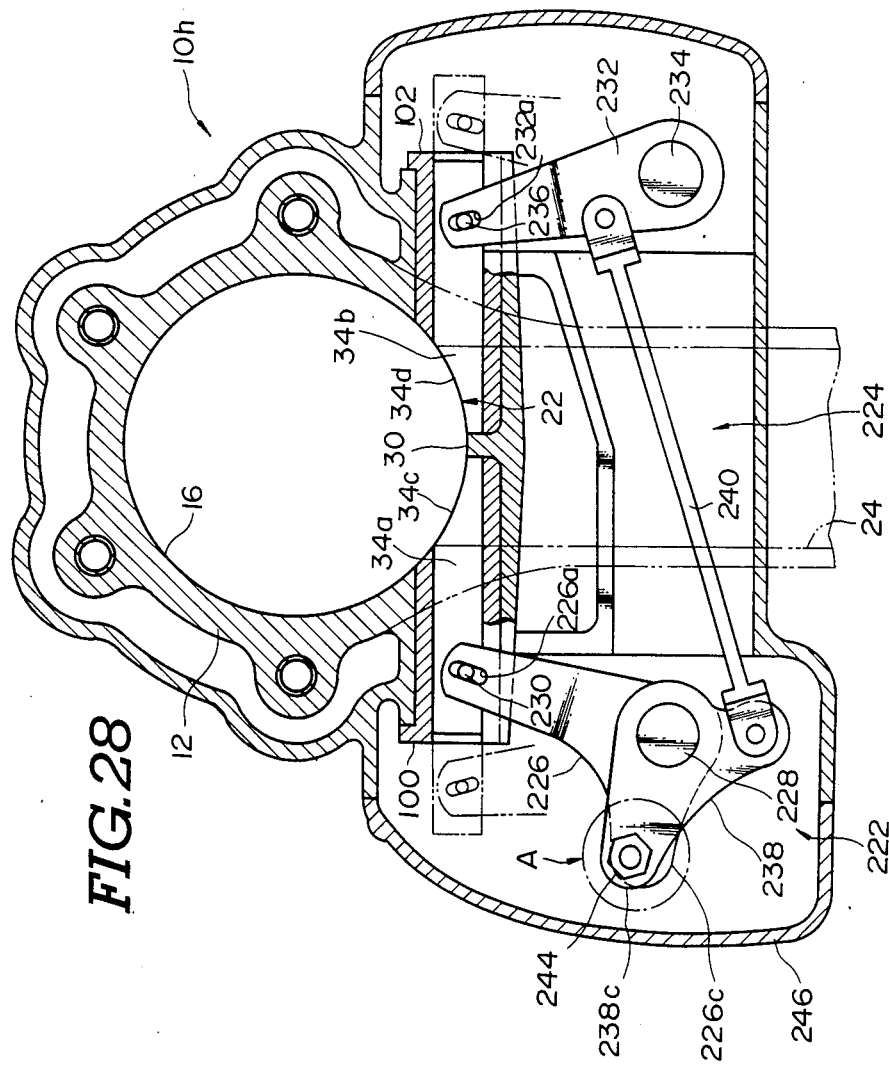

FIG. 28 shows a further modified two-cycle engine 10h which differs from the engine 10c of FIG. 7 in that modified drive means 222 is provided for moving the first and second valve elements 34a and 34b between its closed and open positions, the drive means 222 including means for adjusting the positions of the first and second valve elements 34a and 34b relative to the exhaust port 22, as hereinafter more fully be described. The drive means 222 comprises a power transmission means 224 which comprises a first lever 226 of a generally L-shape is fixedly mounted intermediate opposite ends on a shaft 228 mounted on the cylinder block 12 for rotation about an axis thereof and extending substantially parallel to the axis of the cylinder 16. The first lever 226 has at one end a slot 226a in which a pin 230 secured to the first valve element 34a is received. A second lever 232 is fixedly mounted at one end on a shaft 234 mounted rotatably on the cylinder block 12 and extending substantially parallel to the axis of the cylinder block 12, the second lever 232 having at the other end a slot 232a in which a pin 236 secured to the second valve element 34b is received. The first and second levers 226 and 232 are disposed in a common plane perpendicular to the axis of the cylinder 16. A third lever 238 of a generally triangular shape is rotatably mounted intermediate opposite ends on the shaft 228 and disposed above the first lever 226 in parallel relation thereto. A connecting rod 240 has one end pivotally connected to one end of the third lever 238 while the other end is pivotally connected to the second lever 232 intermediate opposite ends thereof.

Figure 29:
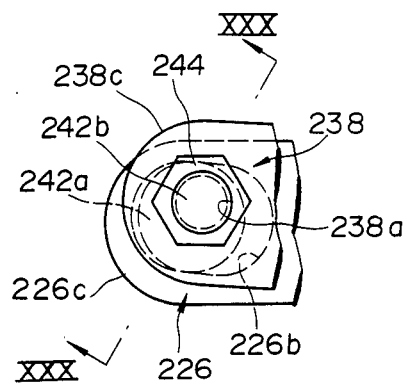
FIG. 29 is an enlarged plan view of the portion of the engine indicated by a circle A of FIG. 28.
Figure 30:
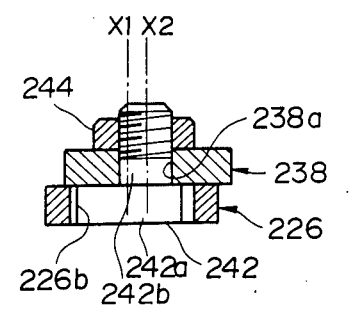
FIG. 30 is a cross-sectional view taken along the line XXX—XXX of FIG. 29.

As best shown in FIGS. 29 and 30, the other ends 226c and 238c of the first and third levers 226 and 238 are disposed in overlapping relation and connected together through a fastener member 242 defined by a disc-shaped base 242a and an eccentric pin 242b extending perpendicularly from one side thereof in eccentric relation to the center or axis of the base 242a. The axis of the base 242a is indicated by X1 in FIG. 30 while the axis of the pin 242b is indicated by X2. More specifically, the base 242a is received in a slot 226b formed in the other end of the first lever 226. The eccentric pin 242b passes through an aperture 238a formed through the other end of the third lever 238. A nut 244 is threaded on an upper threaded end of the eccentric pin 242b to join the first and third levers 226 and 238 together with the end 238c of the third lever 238 clamped between the nut 244 and the end 226c of the first lever 226, so that the first and third levers can be angularly moved in unison upon angular movement of the shaft 228. The drive means 222 comprises an actuator (not shown) such as a servomotor which is connected to the shaft 228 to drive the same for angular movement about its axis.

There may be occasions when the first and second valve elements 34a and 34b can not be brought accurately into their respective predetermined closed positions in the course of use of the engine. For adjusting the positions of the valve elements 34a and 34b relative to the exhaust port 22, a cover member 246 is first removed from the cylinder block 12. Then, the nut 244 is loosened, and the fastener member 242 is slightly moved angularly about the axis of the eccentric pin 242a, so that the angular positions of the first and third levers 226 and 238 with respect to the shaft 228 are suitably adjusted. Thus, the fastener member 242 is easily accessible, and therefore the adjustment can be easily carried out.

The fastener member 242 may have a disc-shaped clamp portion (not shown) formed integrally on the face of the base 242a facing away from the first lever 226, the clamp portion being greater in diameter than the base 242a so that upon tightening of the nut 244, the ends 238c and 226c of the first and third levers 238 and 226 are clamped between the nut 244 and the clamp portion.

Figure 31:
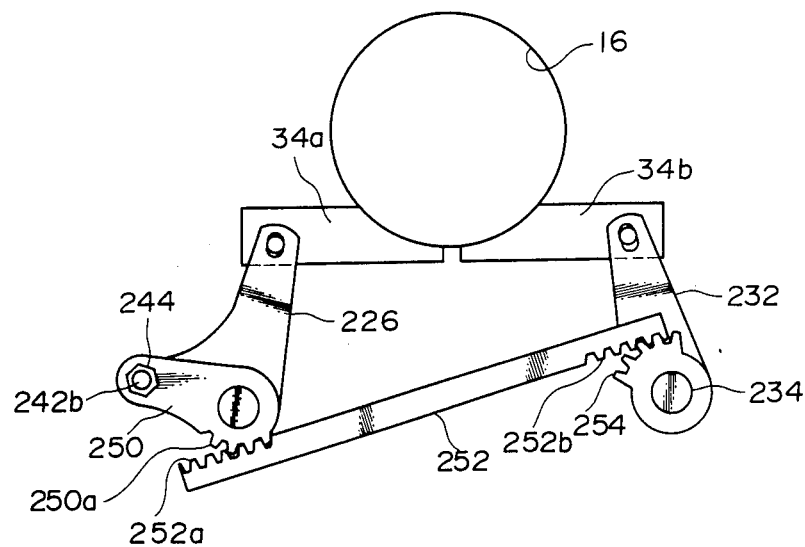
FIG. 31 is a schematic view of a modified drive means.

Further, as shown in FIG. 31, the third lever 238 and the connecting rod 240 may be replaced respectively by a lever 250 having a pinion portion 250a and a connecting rod 252 having a pair of first and second rack portions 252a and 252b at opposite ends thereof, the first rack portion 252 being in mesh with the pinion portion 250a of the lever 250 while the second rack portion 250b is in mesh with a pinion 254 mounted on the shaft 234.

Figure 32:
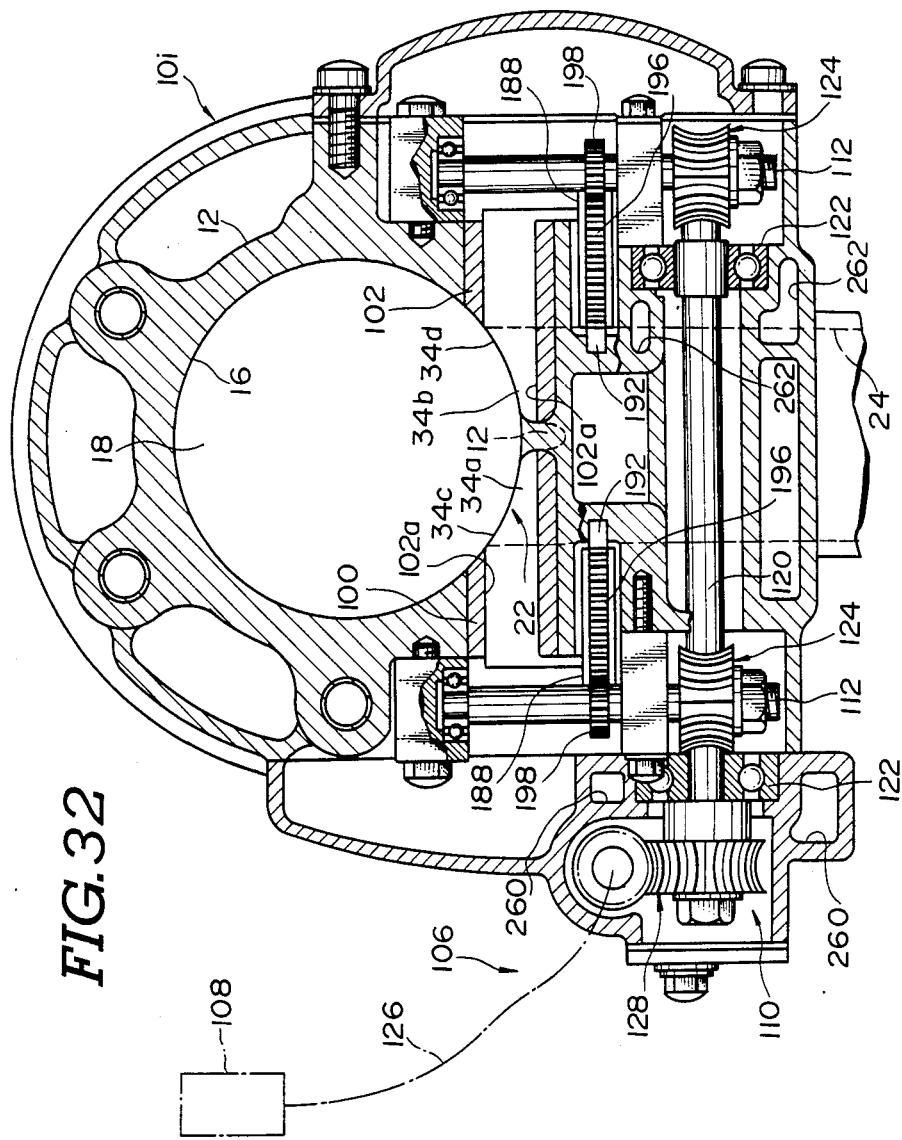
FIG. 32 is a cross-sectional view of a further modified engine.
Figure 33:
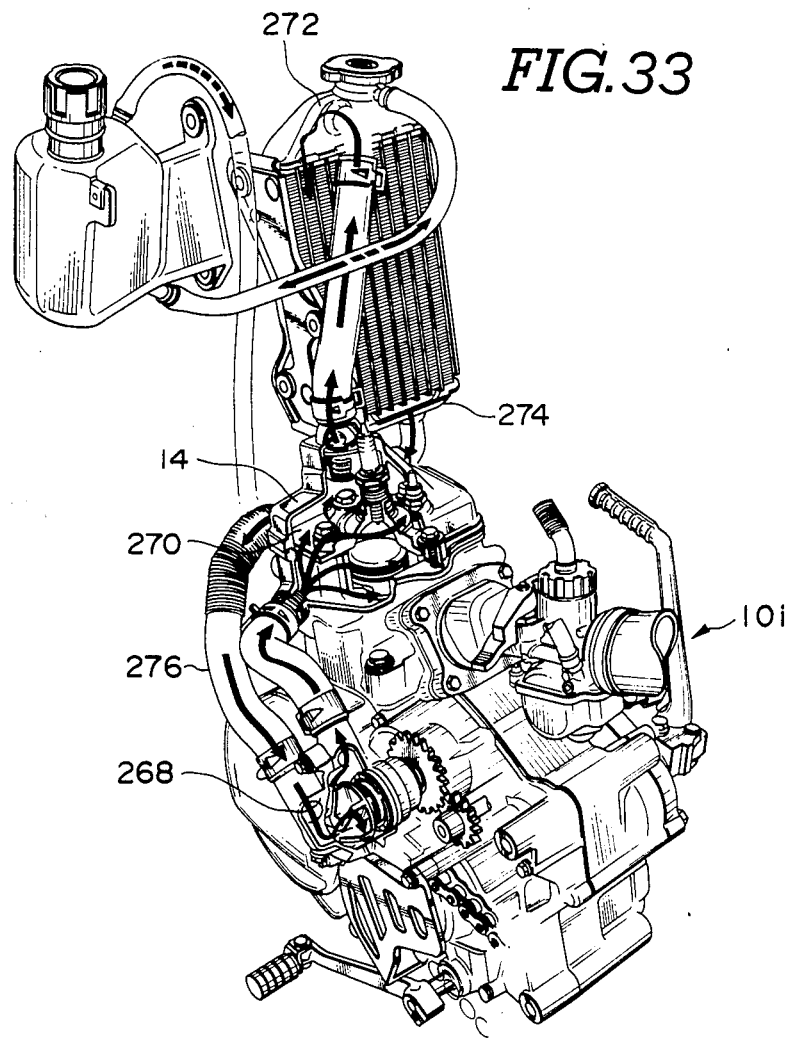
FIG. 33 is a perspective view of the engine of FIG. 32.

FIG. 32 shows a further modified two-cycle engine 10i which differs from the engine 10f of FIG. 25 in that cooling means is provided for cooling the pair of bearings 122 and 122 rotatably supporting the drive shaft 120. More specifically, a first water passageway 260 of a generally annular configuration is formed in the cylinder block 12 in surrounding relation to the left-hand bearing 122 (FIG. 32), and similarly a second water passageway 262 of a generally annular configuration is formed in the cylinder block 12 in surrounding relation to the right-hand bearing 122. The first and second water passageways 260 and 262 are in communication with a cooling water circulation system 264 (FIG. 33) of the engine. The circulating cooling water is fed from a water pump 268 driven by the engine through a cylinder water jacket 270, a passage in the cylinder head 14, a radiator upper tank 272 and a radiator lower tank 274 and is returned to the water pump 268 through a water hose 276. The lower portion of each of the first and second water passageways 260 and 262 communicates with the cylinder water jacket 270 while the upper portion communicates with the passage in the cylinder head 14. With this arrangement, during the operation of the engine, the circulating cooling water flows through the first and second water passageways 260 and 262 in the vicinity of the pair of bearings 122 and 122 to efficiently cool them. Thus, the pair of bearings 122 and 122 are prevented from displacing out of position due to thermal expansion, thereby holding the drive shaft 120 in position to ensure an accurate operation of the power transmission means 204.

What is claimed is:

1. A two-cycle engine comprising:
   (a) a cylinder block having a cylinder head thereon, said cylinder block having a cylinder and an exhaust port formed in a side wall of said cylinder, and said cylinder block having an exhaust passage communicating with said exhaust port wherein a main flow of exhaust gases is expelled from said cylinder through said exhaust port and in a direction along the exhaust passage;
   (b) a piston received in said cylinder for reciprocal movement therealong; and
   (c) a port timing control means comprising a port timing control valve which is mounted on said cylinder block and has a timing control surface, said control valve being movable in a plane substantially perpendicular to the axis of said cylinder between a closed position wherein said valve is disposed in said exhaust passage with said control surface closing the end portion of said exhaust port closer to said cylinder head and an open position wherein said valve is retracted out of said exhaust passage in a direction perpendicular to the flow of said exhaust gases to open said end portion of said exhaust port, said control surface being of an arcuate concave shape and having a curvature substantially equal to that of an inner peripheral surface of said cylinder so as to be smoothly continuous with the inner peripheral surface of said cylinder in said closed position.

2. A two-cycle engine according to claim 1, in which said control valve is movable between its closed and open positions along a straight path.

3. A two-cycle engine according to claim 1, in which said port timing control means comprises a drive means for driving said control valve to move between its closed and open position in accordance with the engine speed.

4. A two-cycle engine according to claim 3, in which said drive means comprises an actuator for producing a rotational force, and a power transmission means for transmitting said rotational force to said control valve, said power transmission means comprising a worm gearing comprising a worm operatively connected to said actuator for being driven for rotation, and a gear meshingly engaging said worm and operatively connected to said control valve to move it between its closed and open positions.

5. A two-cycle engine according to claim 3, further comprising:
(i) an engine speed detector for detecting the engine speed to feed a engine speed data;
(ii) a throttling detector for detecting the amount of throttling of a throttle valve to feed a detection signal, said throttle valve controlling the flow of a fuel mixture to the engine;
(iii) memory for storing valve-switching data representative of the optimum values of the engine speeds at various amounts of throttling of said throttle valve at which values said control valve should be switched from one of its closed and open position to the other to render the power output characteristics of the engine smooth;
(iv) address means reponsive to said detection signal to address said memory to read therefrom the valve-switching data corresponding to the amount of throttling of said throttle valve;
(v) a control unit responsive to said engine speed data and said valve-switching data read from said memory to determine whether said control valve should be closed or opened and to output a control signal; and
(vi) a drive circuit responsive to said control signal to drive said drive means to operate said control valve in accordance with said control signal.

6. A two-cycle engine according to claim 3, in which said cylinder block has a hollow projection in which part of said drive means is accommodated, said exhaust passage including an exhaust pipe which is positioned on that side of said cylinder opposite to said projection.

7. A two-cycle engine according to claim 3, in which said drive means comprises an actuator, a pair of bearings, and a drive shaft borne by said bearings and operatively connected to said actuator for being driven for rotation, said drive shaft being operatively connected to said control valve for moving it between its closed and open position, a pair of water passageways being formed in said cylinder block in surrounding relation to said pair of bearings, and a cooling water circulation system being connected to said water passageway for passing water therethrough to cool said bearings.

8. A two-cycle engine according to claim 3, further comprising:
(i) an engine speed detector for detecting the engine speed to feed a detection signal;
(ii) a control unit programmed to be responsive to said detection signal to determine whether said control valve should be opened or closed and to output a control signal, said control signal representing the opening of said control valve when the engine speed is below a predetermined lower level and above a predetermined higher level, said control signal representing the closing of said control valve when the engine speed is in the range of between said lower and higher levels; and
(iii) a drive circuit responsive to said control signal to drive said drive means to operate said control valve in accordance with said control signal, whereby said control valve is opened when the engine speed is below the predetermined lower level and above the predetermined higher level while said control valve is closed when the engine speed is above the predetermined higher level.

9. A two-cycle engine according to claim 8, further comprising a throttling detector for detecting the amount of throttling of a throttle valve to feed a second detection signal, said throttle valve controlling the flow of a fuel mixture to the engine, said control unit being programmed to determine whether said control valve is opened or closed in accordance with the engine speed and the throttling amount of said throttle valve, said control signal outputted from said control unit representing a predetermined degree of opening of said control valve when the engine speed is below said predetermined lower level and when said throttle amount is zero, said control signal representing the full opening of said control valve when said engine speed is below said predetermined lower level and when said throttle amount is more than zero, whereby said control valve is opened to the predetermined degree at the engine speed of below said lower level when said throttling amount is zero.

10. A two-cycle engine comprising:
(a) a cylinder block having a cylinder head thereon, said cylinder block having a cylinder and an exhaust port formed in a side wall of sid cylinder, and said cylinder block having an exhaust passage comunicating with said exhaust port wherein a main flow of exhaust gases is expelled from said cylinder through said exhaust port and in a direction along the exhaust passage,
(b) a piston received in said cylinder for reciprocal movement therealong; and
(c) a port timing control means comprising a port timing control valve which is mounted on said cylinder block and has a timing control surface, said control valve being movable in a plane substantially perpendicular to the axis of said cylinder between a closed position wherein said valve is disposed in said exhaust passage with said control surface closing the end portion of said exhaust port closer to said cylinder head and an open position wherein said valve is retracted out of said exhaust passage in a direction perpendicular to the flow of said exhaust gases to open said end portion of said exhaust port, said control surface being of an arcuate concave shape and having a curvature substantially equal to that of an inner peripheral surface of said cylinder so as to be smoothly continuous with the inner peripheral of said cylinder in said closed position, and wherein said control valve comprises a pair of first and second valve elements pivotally movable toward and away from said exhaust port to close and open said end portion of said exhaust port, said first and second valve elements having respective surfaces which constitute said control surface.

11. A two-cycle engine according to claim 10, in which said port timing control means comprises a drive means for driving said control valve to move between its closed and open position in accordance with the engine speed.

12. A two-cycle engine according to claim 11, further comprising:
 (i) an engine speed detector for detecting the engine speed to feed an engine speed data;
 (ii) a throttling detector for detecting the amount of throttling of a throttle valve to feed a detection signal, said throttle valve controlling the flow of a fuel mixture to the engine;
 (iii) memory for storing valve-switching data representative of the optimum values of the engine speeds at various amounts of throttling of said throttle valve at which values said control valve should be switched from one of its closed and open position to the other to render the power output characteristics of the engine smooth;
 (iv) address means responsive to said detection signal to address said memory to read therefrom the valve-switching data corresponding to the amount of throttling of said throttle valve;
 (v) a control unit responsive to said engine speed data and said valve-switching data read from said memory to determine whether said control valve should be closed or opened and to output a control signal; and
 (vi) a drive circuit responsive to said control signal to drive said drive means to operate said control valve in accordance with said control signal.

13. A two-cycle engine according to claim 11, further comprising:
 (i) a engine speed detector for detecting the engine speed to feed a detection signal;
 (ii) a control unit programmed to be responsive to said detection signal to determine whether said control valve should be opened or closed and to output a control signal, said control signal representing the opening of said control valve when the engine speed is below a predetermined lower level and above a predetermined higher level, said control signal representing the closing of said control valve when the engine speed is in the range of between said lower and higher levels; and
 (iii) a drive circuit responsive to said control signal to drive said drive means to operate said control valve in accordance with said control signal, whereby said control valve is opened when the engine speed is below the predetermined lower level and above the predetermined higher level while said control valve is closed when the engine speed is above the predetermined higher level.

14. A two-cycle engine according to claim 13, further comprising a throttling detector for detecting the amount of throttling of a throttle valve to feed a second detection signal, said throttle valve controlling the flow of a fuel mixture to the engine, said control unit being programmed to determine whether said control valve is opened or closed in accordance with the engine speed and the throttling amount of said throttle valve, said control signal outputted from said control unit representing a predetermined degree of opening of said control valve when the engine speed is below said predetermined lower level and when said throttle amount is zero, said control signal representing the full opening of said control valve when said engine speed is below said predetermined lower level and when said throttle amount is more than zero, whereby said control valve is opened to the predetermined degree at the engine speed of below said lower level when said throttling amount is zero.

15. A two-cycle engine comprising:
 (a) a cylinder block having a cylinder head thereon, said cylinder block having a cylinder and an exhaust port formed in a side wall of said cylinder, and said cylinder block having an exhaust passage communicating with said exhaust port wherein a main flow of exhaust gases is expelled from said cylinder through said exhaust port and in a direction along the exhaust passage;
 (b) a piston received in said cylinder for reciprocal movement therealong; and
 (c) a port timing control means comprising a port timing control valve which is mounted on said cylinder block and has a timing control surface, said control valve being movable in a plane substantially perpendicular to the axis of said cylinder between a closed position wherein said valve is disposed in said exhaust passage with said control surface closing the end portion of said exhaust port closer to said cylinder head and an open position wherein said valve is retracted out of said exhaust passage in a direction perpendicular to the flow of said exhaust gases to open said end portion of said exhaust port, said control surface being of an arcuate concave shape and having a curvature substantially equal to that of an inner peripheral surface of said cylinder so as to be smoothly continuous with the inner peripheral of said cylinder in said closed position, and wherein said control valve comprises a pair of first and second elongated valve elements disposed coaxially with each other and being movable toward and away from each other along their respective axes to close and open said end portion of said exhaust portion, said first and second valve elements having respective surfaces at their one end portions directed toward each other which surfaces cnstitute said control surface.

16. A two-cycle engine according to claim 15, in which said control valve comprises a pair of coaxially-disposed guide tubes mounted on said cylinder block, said first and second valve elements being of a square cross-section, each of said guide tubes having a cylindrical outer surface and an internal bore of a square cross-section extending therethrough along an axis thereof, each of said first and second valve elements being received in a respective one of said internal bores of said guide tubes for sliding movement therealong toward and away from each other, and each of said first and second valve elements having opposite parallel faces spaced along the axis of said cylinder and disposed in respective planes substantially perpendicular to the axis of said cylinder.

17. A two-cycle engine according to claim 15, in which a pair of auxiliary exhaust ports are formed in the side wall of said cylinder on opposite sides of said exhaust port adjacent thereto, said pair of auxiliary exhaust ports being closed by said first and second valve elements, respectively, when said valve elements are in their closed positions, said pair of auxiliary exhaust ports being in communication with said exhaust passage when said valve elements are in their open positions, and the edge of each of said auxiliary exhaust ports closer to said cylinder head being disposed at the same plane where the edge of said exhaust port closer to said cylinder head lies.

18. A two-cycle engine according to claim 15, in which each of said first and second valve elements has a tubular slider portion extending parallel thereto, a pair of coaxial guide rods being fixedly mounted on the cylinder block and extending along the paths of movement of said first and second valve elements, said slider portions being fitted on said guide rods, respectively, for sliding movement therealong, and a drive means being operatively connected to said slider portions of said first and second valve elements for moving them between their respective closed and open positions.

19. A two-cycle engine according to claim 15, in which a drive rod is mounted on said cylinder block for movement along an axis thereof, said drive rod having a pair of rack portions on opposite sides thereof, a pair of pinions being in mesh with said rack portions, respectively, and operatively connected to said first and second valve elements, respectively, and a drive means being operatively connected to said drive rod for moving it along its axis for moving said first and second valve elements toward and away from each other through said rack and pinion arrangement.

20. A two-cycle engine according to claim 15, in which there are provided a pair of first and second levers having one ends operatively connected to said first and second valve elements, respectively, one of said levers being fixedly mounted on a shaft mounted on said cylinder block for rotation about an axis thereof while the other is rotatably mounted on said shaft, the other ends of said first and second levers being connected together by a fastener member in overlapping relation which fastener member comprises a disc-shaped base and an eccentric pin formed on one side of said base, and said base being received in a slot formed in one of said levers while said eccentric pin extends through the other lever.

* * * * *